United States Patent
Yang et al.

(10) Patent No.: US 10,222,546 B2
(45) Date of Patent: Mar. 5, 2019

(54) I-III-VI TYPE QUANTUM DOTS, LIGHT-EMITTING DEVICE USING THE SAME AND FABRICATING METHODS THEREOF

(71) Applicant: HONGIK UNIVERSITY INDUSTRY-ACADEMIA COOPERATION FOUNDATION, Seoul (KR)

(72) Inventors: Hee-Sun Yang, Seoul (KR); Jong-Hoon Kim, Seoul (KR); Bu-Yong Kim, Goyang-si (KR)

(73) Assignee: HONGIK UNIVERSITY INDUSTRY-ACADEMIA COOPERATION FOUNDATION, Seoul (KR)

( * ) Notice: Subject to any disclaimer, the term of this patent is extended or adjusted under 35 U.S.C. 154(b) by 0 days.

(21) Appl. No.: 15/650,372

(22) Filed: Jul. 14, 2017

(65) Prior Publication Data
US 2018/0252864 A1 Sep. 6, 2018

(30) Foreign Application Priority Data

Mar. 3, 2017 (KR) .................. 10-2017-0027782
Jun. 12, 2017 (KR) .................. 10-2017-0073260

(51) Int. Cl.
*G02B 6/02* (2006.01)
*G02F 1/017* (2006.01)
(Continued)

(52) U.S. Cl.
CPC .......... *G02B 6/0229* (2013.01); *C09K 11/584* (2013.01); *C09K 11/88* (2013.01);
(Continued)

(58) Field of Classification Search
CPC ............. G02F 1/1368; G02F 1/136286; G02F 1/13338; C09K 11/06; H01L 27/124
(Continued)

(56) References Cited

U.S. PATENT DOCUMENTS

| 8,404,570 B2* | 3/2013 | Alivisatos | .............. B82Y 15/00 438/402 |
| 2007/0169811 A1* | 7/2007 | Van Duren | ........... B22F 1/0055 136/262 |

(Continued)

FOREIGN PATENT DOCUMENTS

| KR | 10-2012-0083077 A | 7/2012 |
| KR | 10-2016-0120359 A | 10/2016 |

(Continued)

OTHER PUBLICATIONS

Jang et al., "White-Light-Emitting Diodes with Quantum Dot Color Converters for Display Backlights", Advanced Materials, 2010, vol. 22, pp. 3076-3080.
(Continued)

*Primary Examiner* — Andy Huynh
(74) *Attorney, Agent, or Firm* — Knobbe Martens Olson & Bear LLP

(57) ABSTRACT

There are provided green-emitting quantum dots (QDs) including I-III-VI type ternary Cu—Ga—S core QDs and ZnS multishell wherein Cu:Ga is 1:10 to 1:1, and a fabricating method thereof. Integration of these QDs and red-emitting QDs into a blue LED leads to the fabrication of a white light-emitting device with high color rendering index. There are also provided blue-emitting QDs including I-III-VI type quaternary Zn—Cu—Ga—S or Cu—Ga—Al—S core QDs and ZnS multishell, and a fabricating method thereof. An electrically-driven blue light-emitting device with a QD emitting layer including these QDs interposed
(Continued)

between a hole transport layer and an electron transport layer is fabricated.

7 Claims, 25 Drawing Sheets

(51) Int. Cl.
    *C09K 11/58*     (2006.01)
    *C09K 11/88*     (2006.01)
    *G02F 1/25*     (2006.01)

(52) U.S. Cl.
    CPC ............... *G02F 1/017* (2013.01); *G02F 1/25* (2013.01); *G02F 2001/01791* (2013.01); *G02F 2202/107* (2013.01)

(58) Field of Classification Search
    USPC .......................................................... 257/798
    See application file for complete search history.

(56) References Cited

U.S. PATENT DOCUMENTS

| | | | | |
|---|---|---|---|---|
| 2014/0117253 | A1* | 5/2014 | Edwards | F21S 11/00 250/458.1 |
| 2014/0264257 | A1* | 9/2014 | Hughes | C09K 11/02 257/13 |
| 2014/0264420 | A1* | 9/2014 | Edwards | F21V 9/16 257/98 |
| 2015/0085466 | A1* | 3/2015 | Edwards | F21K 9/56 362/84 |
| 2015/0240153 | A1* | 8/2015 | Hughes | C09K 11/881 252/519.4 |
| 2015/0241758 | A1* | 8/2015 | Carey | G03B 15/05 362/16 |
| 2016/0268483 | A1* | 9/2016 | Theobald | H01L 33/502 |

FOREIGN PATENT DOCUMENTS

| | | |
|---|---|---|
| KR | 10-1665550 B1 | 10/2016 |
| KR | 10-1695442 B1 | 1/2017 |
| WO | 2012/168279 A1 | 12/2012 |

OTHER PUBLICATIONS

Wang et al., "Stable efficient CdSe/CdS/ZnS core/multi-shell nanophosphors fabricated through a phosphine-free route for white light-emitting-diodes with high color rendering properties", Journal of Materials Chemistry, 2011, vol. 21, pp. 8558-8565.

Song et al., "Synthesis of color-tunable Cu—In—Ga—S solid solution quantum dots with high quantum yields for application to white light-emitting diodes", Journal of Materials Chemistry, 2012, vol. 22, pp. 21901-21908.

Chen et al., "Integration of CuInS2-based nanocrystals for high efficiency and high colour rendering white light-emitting diodes", Nanoscale, 2013, vol. 5, pp. 3514-3519.

Yoon et al., "Synthesis and Characterization of Green Zn—Ag—In—S and Red Zn—Cu—In—S Quantum Dots for Ultrahigh Color Quality of Down-Converted White LEDs", ACS Applied Materials & Interfaces, 2015, vol. 7, pp. 7342-7350.

Chuang et al., "Emission-Tunable CuInS2/ZnS Quantum Dots: Structure, Optical Properties, and Application in White Light-Emitting Diodes with High Color Rendering Index", ACS Applied Materials & Interfaces, vol. 6, No. 17—9 pages (Aug. 11, 2014).

Office Action dated Sep. 17, 2018, issued in corresponding Korean Application No. 10-2017-0073260—7 pages.

* cited by examiner

I-III-VI TYPE QUANTUM DOTS, LIGHT-EMITTING DEVICE USING THE SAME AND FABRICATING METHODS THEREOF

TECHNICAL FIELD

The present disclosure relates to non-Cd quantum dots and a fabricating method thereof, and more particularly, to I-III-VI type quantum dots and a fabricating method thereof. The present disclosure also relates to a device using the quantum dots and a fabricating method thereof.

BACKGROUND ART

Keeping pace with the synthetic advancement of colloidal semiconductor quantum dots (QDs) towards high-quality fluorescence, QD-light-emitting diodes (LEDs) on the fundaments of color conversion and electroluminescence (EL) have substantially progressed for last two decades. In the case of color-conversion QD-LEDs, blue InGaN LED chip is the most common source for exciting various QDs in the emission range of green-to-red, whose choice is dependent on the targeted application. For the demonstration of display device with a high color reproducibility, only two colored QDs of highly color-pure green and red emissions are chosen. Meanwhile, in the lighting device that requires a spectral coverage as large as possible to achieve a high color rendering property, QDs with a broad emission character and/or multiple QDs with various color combinations is used, Jang et al. reported that a combination of green- and red-emitting CdSe/multiple-shell QDs and a blue InGaN LED exhibits the luminous efficacy of 41 lm/W in the operating current of 20 mA [2010 Adv. Mater. 22 3076]. According to Wang et al., a combination of green-, yellow- and red-emitting CdSe/multiple-shell QDs and a blue LED exhibits luminous efficacy of 32 lm/W and color rendering index of 88 in the operating current of 40 mA [2011 J. Mater. Chem. 21 8558]. However, the harmful Cd substance in QDs is not desirable when manufacturing sustainable next-generation products without environmental degradation.

Among non-Cd composition candidates capable of visible emission, there are III-V compound InP and II-VI compound ZnSe. However, these compounds with composition have problem with intricate production for accurately achieving desired wavelengths.

I-III-VI type chalcogenide is another promising class of non-Cd visible QD emitters. Through the variation of band gap of QDs by means of control of composition, size, and cationic off-stoichiometry, a wide emission range of green-to-deep red has been attainable.

Yellow-emitting Cu—In—S (hereinafter CIS) or Ag—In—S (hereinafter AIS) QDs have been successfully combined as single downconverters with a blue InGaN LED to produce a white electroluminescence (EL), but the resulting white LEDs possessed only moderate CRIs around 70. This limited color rendering property is primarily attributable to the cyan and red deficiencies in the bicolored (i.e., blue plus yellow) EL distribution. In our earlier investigation, two emitters of greenish-yellow (546 nm) CIGS and orange (578 nm) CIS QDs were integrated with a blue LED. The resultant CRIs were higher than those of single QD-based white devices above, but were not satisfactorily high, not exceeding 80, since PLs of such two QD emitters were spectrally overlapped to a substantial extent and thus not separated sufficiently to secure a large spectral coverage [W. S. Song, J. H. Kim, J. H. Lee, H. S. Lee, Y. R. Do and H. Yang, *J. Mater. Chem.*, 2012, 22, 21901-21908].

It will be desirable if a combination of green and red QDs, most commonly used in color combinations, in particular, non-Cd type QDs, with a blue LED can yield high-color rendering white lighting.

Chen et al. synthesized two different-colored downconverters of green Zn—Cu—In—S (hereinafter ZCIS) (525-535 nm) and red (615 nm) CIS QDs and fabricated low- (20 mA) and high-power (350 mA driving) white QD-LEDs that yielded 95 and 90.5 in CRI and 70 and 10-15 lm/W in luminous efficacy, respectively. Later, based on a wisely chosen combination of green (501 nm) Zn—Ag—In—S (hereinafter ZAIS) and red (606 nm) ZCIS QD emitters ultrahigh color-quality white QD-LEDs with the record CRIs of 94-97 and the reasonable luminous efficacies of 26.7-39.6 lm/W were devised. [H. C. Yoon, J. H. Oh, M. Ko, H. Yoo and Y. R. Do, *ACS Appl. Mater. Interfaces*, 2015, 7, 7342-73 50].

A strong vantage point of the above color-conversion QL-LEDs is the unnecessariness of blue QD, rendering their commercialization more viable. On the other hand, EL-QD-LED should have a blue QD emitter as a primary color for the realization of full-color emission for display and white emission for lighting device.

Blue QDs have been synthesized mostly with Cd-containing II-VI compositions such as CdZnS, CdZnSe, and CdZnSeS and then successfully utilized as active emitting components for the fabrication of mono- and multi-chromatic EL-QD-LEDs. However, the harmful Cd substance in such blue QD elicits a grave concern in applying them for the manufacturing of sustainable next-generation products without environmental degradation as mentioned previously.

Among a few non-Cd composition candidates suitable for synthesis of visible QD emitters, III-V InP is the most studied one, particularly since optimally synthesized InP QDs are comparable to well-developed Cd QDs with respect to photoluminescence (PL) quantum yield (QY) and emission bandwidth. However, synthesis of InP QDs has been highly weighted towards green-to-red colors with blue emitters nearly unexplored. Given a relatively low-energy bulk band gap (1.35 eV at room temperature) of InP, InP QDs should be ultrasmall-sized or placed in a highly strong quantum confinement regime to produce a high-energy blue emission, which in turn makes their controlled synthesis highly challenging. Nevertheless, a few blue InP QDs with emission peak wavelengths of <480 nm were developed, but the resulting QDs possessed unsatisfactory QYs of 5-40%, depending on their own core/shell structural details.

Another QD composition candidate for non-Cd blue emitters is II-VI ZnSe, whose band gap (2.69 eV) is significantly higher than that of InP. This implies that ZnSe QDs should be relatively large-sized to obtain relevant blue color wavelengths, which may be also a tough task in the practical QD synthesis. For that reason, most of ZnSe QDs to date have exhibited intermediate wavelengths between violet and blue color.

I-III-VI type chalcogenide is another promising class of non-Cd visible QD emitters. Through the variation of band gap of QDs by means of control of composition, size, and cationic off-stoichiometry, a wide emission range of green-to-deep red has been attainable. However, highly fluorescent I-III-VI QDs capable of emitting shorter wavelengths than ca. 500 nm (corresponding to greenish cyan) have not been demonstrated yet.

SUMMARY

The present disclosure is directed to providing new I-III-VI type quantum dots (QDs) and a fabricating method thereof.

The present disclosure is further directed to providing a light-emitting device using the QDs and fabricating method thereof.

In one aspect, quantum dots (QDs) according to embodiments of the present disclosure include I-III-VI type ternary Cu—Ga—S core QDs and ZnS multishell, wherein the Cu—Ga—S has Cu:Ga of 1:10 to 1:1. The QDs are capable of green emission.

The present disclosure also proposes that the core QDs are I-III-VI type quaternary Zn—Cu—Ga—S core QDs further including Zn, or I-III-VI type quaternary Cu—Ga—Al—S core QDs further including Al, and the Zn—Cu—Ga—S has Cu:(Zn+Ga) of 1:10 to 1:1, and the Cu—Ga—Al—S has Cu:(Ga+Al) of 1:10 to 1:1. The QDs are capable of blue emission.

Preferably, the Zn—Cu—Ga—S has Zn:Ga=(1−x):x, and the Cu—Ga—Al—S has Al:Ga=(1−x):x, where $0.5 < x < 1$.

A method for fabricating QDs according to embodiments of the present disclosure includes forming I-III-VI type ternary Cu—Ga—S core QDs, and forming ZnS multishell on the core QDs, wherein the Cu—Ga—S has Cu:Ga of 1:10 to 1:1.

Here, the forming of the Cu—Ga—S core QDs may be performed by heating a blend solution containing precursors of Cu, Ga and S, sulfur, and solvent.

The forming of the ZnS multishell on the core QDs may be performed by application of ZnS stock solution, and the application of the ZnS stock solution may be performed continuously twice or more.

The application of the ZnS stock solution may be performed continuously twice or more at different concentrations of each ZnS stock solution and different reaction temperatures.

Preferably, the forming of the Cu—Ga—S core QDs is performed by heating a blend solution containing CuI, GaI, 1-dodecanethiol, sulfur, and oleylamine, and the forming of the ZnS multishell on the core QDs includes applying ZnS stock solution containing zinc acetate, octadecene, and oleic acid, and applying another ZnS stock solution containing zinc stearate, octadecene, and 1-dodecanethiol.

The present disclosure also proposes the method for fabricating QDs further including forming I-III-VI type quaternary Zn—Cu—Ga—S core QDs by alloying Zn into the Cu—Ga—S core QDs, or forming Cu—Ga—Al—S core QDs by alloying Al into the Cu—Ga—S core QDs.

The Zn—Cu—Ga—S core QDs have Cu:(Zn+Ga) of 1:10 to 1:1, and the Cu—Ga—Al—S has Cu:(Ga+Al) of 1:10 to 1:1.

In this method, the forming of the Cu—Ga—S core QDs is performed by heating a blend solution containing precursors of Cu, Ga and S, sulfur, and solvent, the forming of the Zn—Cu—Ga—S core QDs is performed with an addition of Zn precursor to the blend solution having the Cu—Ga—S core QDs, and the forming of the Cu—Ga—Al—S core QDs is performed with an addition of Al precursor to the blend solution having the Cu—Ga—S core QDs.

Preferably, the forming of the Cu—Ga—S core QDs is performed by heating a blend solution containing CuI, GaI, 1-dodecanethiol, sulfur, and oleylamine, the forming of the Zn—Cu—Ga—S core QDs is performed with an addition of $ZnCl_2$ to the blend solution having the Cu—Ga—S core QDs, and the forming of the ZnS multishell includes applying ZnS stock solution containing zinc acetate, octadecene, and oleic acid, and applying another ZnS stock solution containing zinc stearate, octadecene, and 1-dodecanethiol.

One aspect of the present disclosure proposes a white light-emitting device with high color rendering index using green and red separated two I-III-VI type QDs.

The light-emitting device according to embodiments of the present disclosure is a white light-emitting device in which green-emitting QDs and red-emitting QDs are integrated into a blue light-emitting diode, wherein the green-emitting QDs are QDs including I-III-VI type ternary Cu—Ga—S core QDs and ZnS multishell, in which the Cu—Ga—S has Cu:Ga of 1:10 to 1:1, and the red-emitting QDs are QDs including I-III-VI type ternary Cu—In—S core QDs and ZnS multishell, in which the Cu—In—S has Cu:In of 1:10 to 1:1.

In this light-emitting device, a degree of Cu deficiency in the green-emitting QDs may be equal to a degree of Cu deficiency in the red-emitting QDs.

The present disclosure also proposes a method for fabricating the light-emitting device.

This method includes preparing green-emitting QDs and red-emitting QDs, and integrating the green-emitting QDss and the red-emitting QDs into a blue light-emitting diode, wherein the green-emitting QDs are QDs including I-III-VI type ternary Cu—Ga—S core QDs and ZnS multishell, in which the Cu—Ga—S has Cu:Ga of 1:10 to 1:1, and the red-emitting QDs are QDs including I-III-VI type ternary Cu—In—S core QDs and ZnS multishell, in which the Cu—In—S has Cu:In of 1:10 to 1:1.

Preferably, the preparing of the green-emitting QDs includes forming I-III-VI type ternary Cu—Ga—S core QDs, and forming ZnS multishell on the Cu—Ga—S core QDs, and the preparing of the red-emitting QDs includes forming I-III-VI type ternary Cu—In—S core QDs, and forming ZnS multishell on the Cu—In—S core QDs.

In this instance, preferably, the forming of the Cu—Ga—S core QDs is performed by heating a blend solution containing CuI, GaI, 1-dodecanethiol, sulfur, and oleylamine, the forming of the ZnS multishell on the Cu—Ga—S core QDs includes applying ZnS stock solution containing zinc acetate, octadecene, and oleic acid, and applying another ZnS stock solution containing zinc stearate, octadecene, and 1-dodecanethiol, the forming of the Cu—In—S core QDs is performed by heating a blend solution containing CuI, indium acetate, 1-dodecanethiol, sulfur, and oleylamine, and the forming of the ZnS multishell on the Cu—In—S core QDs includes applying ZnS stock solution containing zinc acetate, octadecene, and oleic acid.

The present disclosure also proposes a blue light-emitting device including a hole transport layer, an emitting layer of blue-emitting QDs, and an electron transport layer.

In this light-emitting device, the blue-emitting QDs are QDs including I-III-VI type quaternary Zn—Cu—Ga—S or Cu—Ga—Al—S core QDs and ZnS multishell, in which the Zn—Cu—Ga—S has Cu:(Zn+Ga) of 1:10 to 1:1, and the Cu—Ga—Al—S has Cu:(Ga+Al) of 1:10 to 1:1.

The present disclosure also proposes a method for fabricating the light-emitting device.

This method includes preparing blue-emitting QDs, and forming a hole transport layer, an emitting layer of the blue-emitting QDs, and an electron transport layer, wherein the blue-emitting QDs are QDs including I-III-VI type quaternary Zn—Cu—Ga—S or Cu—Ga—Al—S core QDs and ZnS multishell, in which the Zn—Cu—Ga—S has Cu:(Zn+Ga) of 1:10 to 1:1, and the Cu—Ga—Al—S has Cu:(Ga+Al) of 1:10 to 1:1.

Here, preferably, the preparing of the blue-emitting QDs includes forming I-III-VI type ternary Cu—Ga—S core QDs, forming I-III-VI type quaternary Zn—Cu—Ga—S core QDs by alloying Zn into the Cu—Ga—S core QDs or forming Cu—Ga—Al—S core QDs by alloying Al into the Cu—Ga—S core QDs, and forming ZnS multishell on the core QDs.

Furthermore, in this instance, preferably, the forming of the Cu—Ga—S core QDs is performed by heating a blend solution containing CuI, GaI, 1-dodecanethiol, sulfur, and oleylamine, the forming of the Zn—Cu—Ga—S core QDs is performed with an addition of $ZnCl_2$ to the blend solution having the Cu—Ga—S core QDs, and the forming of the ZnS shell includes applying ZnS stock solution containing zinc acetate, octadecene, and oleic acid, and applying another ZnS stock solution containing zinc stearate, octadecene, and 1-dodecanethiol.

According to embodiments of the present disclosure, the use of I-III-VI type ternary Cu—Ga—S core quantum dots (QDs) and multiple-ZnS shelled QDs can achieve green emission spectrum with very high PL and QYs higher than 80%.

Particularly, Cu—Ga—S core QDs and multiple-ZnS shelled green-emitting QDs fabricated by the method according to embodiments of the present disclosure can exhibit emission wavelengths in the range of 500-535 nm.

The green-emitting QDs and the red-emitting QDs are integrated with blue LED to produce white light-emitting devices with high color rendering index.

Particularly, to provide a distinct color separation of green and red, the present disclosure proposes QDs including I-III-VI type Cu—Ga—S core QDs and ZnS multishell for green-emitting QDs, and QDs including I-III-VI type Cu—In—S core QDs and ZnS multishell for red-emitting QDs. A novel combination of these two QD emitters with a broad PL nature could provide a balanced white spectral distribution, when they were integrated with a blue LED, by means of their distinct color separation (green, red) along with the effective mitigation of cyan gap.

By varying a weight ratio between CGS/ZnS core/shell QDs and CIS/ZnS core/shell QDs from 2 to 4.8 wt % CIS/ZnS core/shell QDs and copackaging them in a single blue LED, a series of tricolored white QD-LEDs was fabricated, yielding CIS-to-CGS QD weight ratio-dependent wide distributions in EL quantities such as 82-95 in CRI, 4486-7582K in CCT, and 40.5-65.3 lm/W at a driving current of 100 mA.

The QD-LED with 2.9 wt % CIS/ZnS core/shell QDs produces relatively stable white emissions against current variation with 94-97 in CRI and 5651-5752K in CCT in the range of 20-300 mA, although its luminous efficacy decreased somewhat markedly with increasing current from 68.8 lm/W at 20 mA to 43.1 lm/W at 300 mA.

According to embodiments of the present disclosure, the use of QDs including I-III-VI type quaternary Zn—Cu—Ga—S or Cu—Ga—Al—S core QDs and ZnS multishell achieves blue-emitting spectrum with very high PL and QY. Any non-Cd blue-emitting QDs with such high levels of QY is not known yet.

Particularly, blue-emitting QDs including Zn—Cu—Ga—S core QDs and ZnS multishell fabricated by the method according to embodiments of the present disclosure not only exhibited systematically emission-tunable wavelengths from 486 nm (azure) to 471 nm (blue) but possessed sufficiently high QYs of 78-83% to be practically applicable to fabrication of optoelectronic devices.

BRIEF DESCRIPTION OF THE DRAWINGS

FIG. 19 further shows (c) a TEM image of core/shell QD shown in (a) of FIG. 19 (scale bar: 10 nm).

DETAILED DESCRIPTION

Hereinafter, embodiments of the present disclosure will be described in detail with reference to the accompanying drawings. However, the present disclosure is not limited to the embodiments disclosed below and may be embodied in many different forms, and rather, these embodiments are provided to render the disclosure of the present disclosure complete and help those having ordinary skill in the art fully understand the scope of the present disclosure. The present disclosure proposes Cu—Ga—S (hereinafter, CGS) and Cu—In—S (hereinafter, CIS) as two I-III-VI type materials having a large band gap difference to provide color-separated broad PL characters while ensuring a spectral coverage as large as possible, and proposes a high color rendering white QD-LED using the same.

Figure 1:
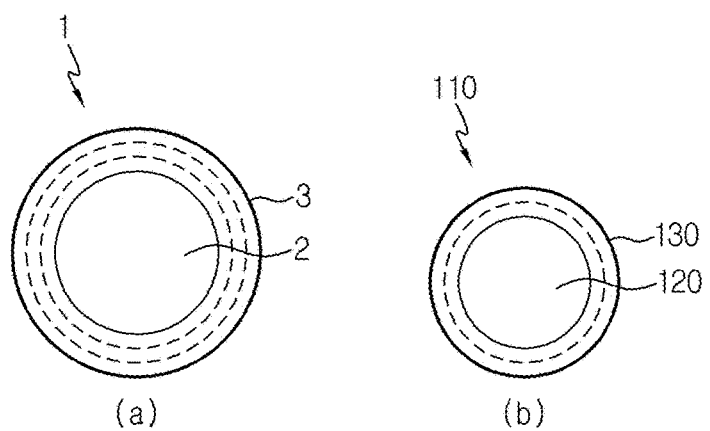
FIG. 1 is a schematic diagram of green-emitting quantum dot (QD) and red-emitting QD according to embodiments of the present disclosure.

FIG. 1 is a schematic diagram of green-emitting quantum dot and red-emitting quantum dot according to embodiments of the present disclosure.

Referring to FIG. 1, the present disclosure proposes green emission-capable non-Cd type quantum dot 1. The quantum dot 1 includes I-III-VI type ternary CGS core QD 2 and ZnS shell 3, and in the specification, it is referred to as CGS/ZnS core/shell QD.

When the CGS core QD 2 is coated with ZnS to form the ZnS shell 3, both PL and QY are improved compared to those of the CGS core QD 2.

The inventors found out that Cu, Ga and S are indispensable for green emission of I-III-VI type QDs, i.e., CGS is essential, and in particular, a chemical composition should be adjusted to a Cu/Ga ratio of 1:10 to 1:1, namely, the amount of Cu is equal to the amount of Ga or is slightly deficient (off-stoichiometry). The Cu/Ga ratio of 1/10 or above exhibits green emission, and the Cu/Ga ratio exceeding 1 does not exhibit green emission.

By adjusting the Cu/Ga ratio, the green emission wavelengths can be adjusted. The desirable Cu/Ga ratio may be 1/2, 1/4 or 1/6, and especially 1/4. When the Cu/Ga ratio is 1/2, the emission wavelength of the QD 1 is 536 nm, when the Cu/Ga ratio is 1/4, the emission wavelength of the QD 1 is 514 nm, and when the Cu/Ga ratio is 1/6, the emission wavelength of the QD 1 is 495 nm. Based on the adjusted Cu/Ga ratio, the emission wavelength of the QD 1 may range 500-535 nm.

The ZnS shell 3 may be multiple, for example, double or triple, and preferably, the triple ZnS shell 3 of the QD 1 is formed through application of a stock solution three times. In embodiments, as shown, ZnS shell is formed up to the part indicated by the dashed line first, and then the remaining ZnS shell is formed up to the part indicated by the solid line. Particularly, as described below, the ZnS shelling process is continuously performed, so there is no substantial layer separation in the ZnS shell 3. Each layer may have different compositions. The composition may change discontinuously based on the dashed line, and may change continuously over the entire ZnS shell 3. The ZnS multishell 3 provides excellent passivation effects. Accordingly, quantum yield (QY) of the QD 1 can be improved.

As such, according to embodiments of the present disclosure, the use of the QD 1 including the CGS core QD 2 and the ZnS shell 3 can yield green emission. Furthermore, high QY can be achieved. When Cu:Ga in the CGS core QD 2 is 1:10 to 1:1 and the ZnS shell 3 is multishell, it has a suitable wavelength range, especially, for white light-emitting devices as described below.

The present disclosure also proposes red emission-capable non-Cd type QD 110. The QD 110 includes I-III-VI type ternary CIS core QD 120 and ZnS shell 130, and in the specification, it is referred to as CIS/ZnS core/shell QD.

In the same way as the CGS core QD 2, when the CIS core QD 120 is coated with ZnS to form the ZnS shell 130, both PL and QY are improved compared to those of the CIS core QD 120.

For the CIS core QD 120 possessing red emission to be suitable for realizing a white light-emitting device in combination with the green-emitting QD 1, it is preferable to adjust a chemical composition to a Cu/In ratio of 1:10 to 1:1, namely, the amount of Cu is equal to the amount of In or is slightly deficient. The red-emitting QD 110 is integrated into a blue LED with the green-emitting QD 1 for yielding high color rendering index white. In this instance, the degree of Cu deficiency in the green-emitting QD 1, or the Cu/Ga ratio is preferably equal to the degree of Cu deficiency in the red-emitting QD 110, or the Cu/In ratio.

Similar to adjusting the green emission wavelength by adjusting the Cu/Ga ratio in the green-emitting QD 1, the red emission wavelength can be adjusted by adjusting the Cu/In ratio in the red-emitting QD 110. In the same way as the Cu/Ga ratio, the desirable Cu/In ratio may be 1/2, 1/4 or 1/6, and especially 1/4. When the Cu/Ga ratio is 1/4, the emission wavelength of the QD 110 is 594 nm.

In the same way as the ZnS shell 3, the ZnS shell 130 may be multiple, for example, double or triple, and preferably, the double ZnS shell 130 of the QD 110 is formed through application of a stock solution twice. In embodiments, as shown, ZnS shell is formed up to the part indicated by the dashed line first, and then the remaining ZnS shell is formed up to the part indicated by the solid line. Particularly, as described below, the process for forming the ZnS shell 130 is also performed continuously multiple times, so there is no substantial layer separation in the ZnS shell 130. Each layer may have different compositions. The composition may change discontinuously based on the dashed line, and may change continuously over the entire ZnS shell 130. The ZnS multishell 130 provides excellent passivation effects. Accordingly, QY of the QD 110 can be improved.

The use of the QD 110 including the CIS core QD 120 and the ZnS shell 130 can yield red emission. Furthermore, high QY can be achieved. When Cu:In in the CIS core QD 120 is 1:10 to 1:1 and the ZnS shell 130 is multishell, it has a suitable wavelength range, especially, for white light-emitting devices as described below, and in this case, QY is measured up to 83%.

The CGS core QD 2 and the CIS core QD 120 may be fabricated through a hot colloid method, a solvothermal method, heating-up or hot-injection, and the ZnS shell 3, 130 may be subjected to a cation exchange process and a solvothermal method, and an embodiment of a fabricating method will be described below.

Figure 2:
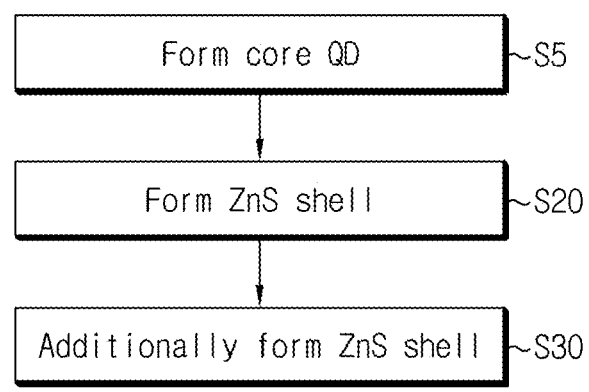
FIG. 2 is a flowchart showing an embodiment of a method for fabricating QDs according to embodiments of the present disclosure.

FIG. 2 is a flowchart showing an embodiment of a method for fabricating QDs according to embodiments of the present disclosure.

The case of the fabrication of the CGS/ZnS core/shell QD 1 is mainly described below. The fabrication of the CIS/ZnS core/shell QD 110 is similar to the fabrication of the CGS/ZnS core/shell QD 1, except the precursor type and some of the ZnS shelling process conditions.

First, the step for growing core QD from a solution containing precursors is performed (S5).

A blend solution prepared by mixing the precursors of Cu, Ga and S, sulfur, and solvent is heated to grow the CGS core QD 2 first.

The present disclosure may fabricate the ternary CGS core QD 2 which is the fundamental of QDs exhibiting green emission at 495-536 nm through choice of CGS composition and Cu/Ga stoichiometric control.

The starting materials for growing the CGS core QD 2 are a basic combination of CuI as copper precursor, GaI as gallium precursor, 1-dodecanethiol as sulfur precursor, sulfur, and oleylamine as solvent.

A ratio of the starting materials ranges Cu:Ga=1:10 to 1:1 as mentioned previously. The copper precursor may include CuI as well as copper acetate, copper bromide, and copper chloride. The gallium precursor may include GaI as well as gallium acetate, gallium chloride, and gallium acetylacetonate. The sulfur precursor may include 1-dodecanethiol as well as various alkyl thiols such as octanethiol, hexadecanethiol and decanethiol. The solvent may include oleylamine as well as various fatty amines such as dodecylamine and trioctylamine.

Heating of the blend solution may be performed through a plurality of steps. First, degassing may be performed in the course of heating to 120° C. Subsequently, the growth temperature may be increased to 240° C. In this instance, $N_2$ purging may be performed.

Subsequently, the ZnS shelling step, S20 and S30, is performed. In this embodiment, after the CGS core QD 2 is formed, ZnS stock solution is applied onto the CGS core QD 2 to form the ZnS shell 3 (S20, S30).

The ZnS shelling step includes S20 and S30, and may be performed continuously two or more times. In this instance, each step may differ in concentration of the ZnS stock solution and reaction temperature and time. The second reaction may have higher temperature or longer time.

For example, ZnS stock solution is primarily applied to a result having the CGS core QD 2 to form ZnS shell at S20, and another ZnS stock solution is applied to the result to additionally form ZnS shell at S30, which is succeeded by S20.

Each of S20 and S30 may include sub-steps, and two or more shelling processes may be performed.

For example, the first ZnS stock solution at S20 may be prepared with a basic combination of zinc acetate as Zn precursor and octadecene and oleic acid as solvent. In this instance, the zinc precursor may include zinc acetate as well as zinc stearate, zinc oxide, zinc nitride, and zinc acetylacetonate, and the oleic acid may include stearic acid and myristic acid. In the first ZnS shelling at S20, the reaction temperature may range 200° C. to 280° C., and the reaction time may range 1 min to 2 h. Preferably, the reaction is retained at the temperature of 240° C. for 1 h.

The second ZnS stock solution at S20 may be prepared with a basic combination of zinc acetate as Zn precursor and octadecene and oleic acid as solvent in the same way as the first ZnS stock solution, but at different concentration. The second ZnS shell reaction temperature at S20 may be equal to or higher than the first ZnS reaction temperature, and the reaction time may be shorter or longer than or equal to the first ZnS reaction time. Preferably, the reaction is retained at the temperature of 240° C. for 1 h.

Another ZnS stock solution at S30 is of different type from the first and second ZnS stock solutions at S20. For example, another ZnS stock solution may be prepared with a basic combination of zinc stearate as Zn precursor, 1-dodecanethiol as sulfur precursor, and octadecene as solvent. In this instance, the zinc precursor may include zinc stearate as well as zinc acetate, zinc oxide, zinc nitride and zinc acetylacetonate, and the sulfur precursor may include other alkyl thiols.

In the ZnS shelling at S30, the reaction temperature may range 180° C. to 300° C., and the reaction time may range 1 min to 24 h. In the reaction at S30, the temperature may be higher than that of S20, or the time may be longer than or equal to that of S20. Preferably, the final reaction for another ZnS shelling may be retained at 250° C. for 1 h.

QYs of CGS QDs after ZnS shelling according to the experimental method as described below reach 78-83%, yielding results that cannot be achieved by InP QDs with similar emission wavelengths.

The process for fabricating CIS/ZnS core/shell QD 110 begins with S5. However, the type of precursor used is In precursor instead of Ga precursor. Accordingly, starting materials may be a basic combination of CuI, indium acetate as indium precursor, 1-dodecanethiol as sulfur precursor, sulfur, and oleylamine as solvent.

The ZnS shell 130 process for the CIS/ZnS core/shell QD 110 is only performed through S20, here, through sub-steps of S20 in the same way as previously, to form a double shell.

Hereinafter, specific experimental examples are described to explain the present disclosure in further detail.

Experimental Method:

Fabrication of CGS/ZnS Core/Shell QDs and CIS/ZnS Core/Shell QDs

In fabricating green QDs, or CGS/ZnS core/shell QDs, ternary CGS core QDs with Cu/Ga precursor molar ratios of 1/2, 1/4 and 1/6 were prepared and then ZnS shelling was applied under the same condition for each QD.

Taking 1/4 molar ratio sample as an example, 0.125 mmol of CuI (99.999%), 0.5 mmol of $GaI_3$ (99.99%) and 1 mmol of sulfur (99.998%), 1.5 mL of 1-dodecanethiol (DDT≥98%) and 5 mL of oleylamine (OLA, 70%) were placed in three-neck flask, and then degassed/$N_2$-purged during heating to 120° C. The temperature of this mixture was raised to and maintained at 240° C. for 5 min for growth of CGS core QDs.

Subsequent to the core QD fabricating step, the core QDs were identically subjected to the following multiple-shelling reaction.

The first ZnS shell stock solution prepared by dissolving 8 mmol of Zn acetate dihydrate (reagent grade) in 8 mL of oleic acid (OA, 90%) and 4 mL of 1-octadecene (ODE, 90%) was added slowly to the core QD growth solution, followed by reaction at 240° C. for 1 h.

Subsequently, the second ZnS shell stock solution consisting of 4 mmol of Zn acetate dihydrate, 4 mL of OA, 2 mL of DDT, and 2 mL of ODE was slowly introduced and reacted at the same temperature for 30 min. After that, the third ZnS shell stock solution containing 4 mmol of zinc stearate (10-12% Zn basis), 4 mL of ODE, and 2 mL of DDT was injected, and the final shelling reaction was retained at 250° C. for 1 h.

Meanwhile, in fabricating red QDs, or CIS/ZnS core/shell QDs, the method for fabricating CGS/ZnS core/shell QDs was similarly applied.

In fabricating CIS core QDs, the Ga precursor $GaI_3$ was replaced with the In precursor In acetate with a Cu/In precursor molar ratio of 1/4 chosen, while by and large following the fabrication details of CGS core QDs above with a modification of the core growth condition to 180° C. for 30 min from at 240° C. for 5 min for CGS. The method for fabricating CGS core QDs as previously described was equally used, except the precursor type and the growth temperature and time.

Subsequently, ZnS multiple-shelling process was performed in the same manner as the CGS/ZnS core/shell QDs previously, but finalized after the $2^{nd}$ shelling, not $3^{rd}$ shelling.

As-reacted QDs were then subjected to the precipitation with an excess of ethanol and purification with a solvent combination of hexane/ethanol by centrifugation (9000 rpm, 10 min), and finally re-dispersed in chloroform.

Fabrication of White QD-LED

Figure 3:
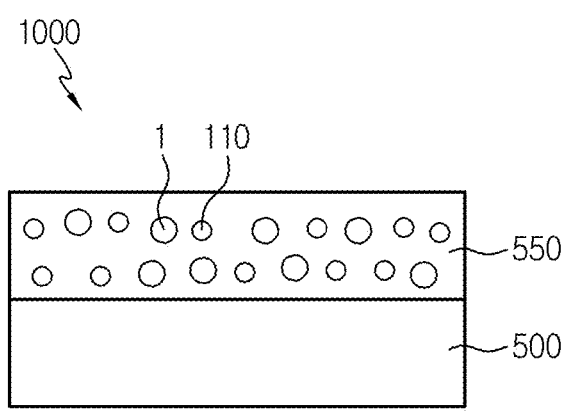
FIG. 3 is a schematic cross-sectional view of a white QD-LED fabricated according to embodiments of the present disclosure.

FIG. 3 is a schematic cross-sectional view of a white QD-LED fabricated according to embodiment of the present disclosure.

Referring to FIG. 3, a white QD-LED 1000 is a result of integrating the green-emitting QDs 1 and the red-emitting QDs 110 prepared as described above into a blue LED 500. The green-emitting QDs 1 and the red-emitting QDs 110 may be dispersed in organic 550, and the organic 550 may come from thermally curable resin such as epoxy or silicon.

In experimental example, using a surface-mounted typed, white QD-LEDs were fabricated by copackaging blue InGaN LED (λ=455 nm) with green CGS/ZnS core/shell QDs and red CIS/ZnS core/shell QDs.

Two dispersions of CGS/ZnS core/shell QDs and CIS/ZnS core/shell QDs in chloroform with the identical optical density of about 3.0 at 450 nm, corresponding to about 70 and about 7 mg/ml, respectively, were blended in four different weight ratios as follows; with each 0.5 ml of CGS/ZnS core/shell QD dispersion different volumes of 0.1, 0.15, 0.2, and 0.25 ml of CIS/ZnS core/shell QD dispersions were mixed, and then the total volume of the blended dispersions was identically adjusted to be 1 ml by adding an extra chloroform, corresponding to 2, 2.9, 3.8, and 4.8 wt % CIS/ZnS core/shell QDs, respectively.

These core/shell QD-blended dispersions were individually mixed with 0.4 g of thermally curable epoxy resin (YD-128, Kukdo Chem., Korea). The resultant QD-resin pre-mixture was placed on hot plate at 60° C. for 30 min to remove chloroform, followed by addition of 0.4 g of a hardener (KFH-271, Kukdo Chem., Korea). This QD-paste was dispensed on a blue LED mold and then cured in an oven by a sequential thermal process of 90° C. for 1 h and 120° C. for 30 min.

Evaluation Tool:

Absorption and PL spectra of QDs were recorded with a UV-visible absorption spectroscopy (Shimadzu, UV-2450) and a 500 W xenon lamp-equipped spectrophotometer (PSI Inc., Darsa Pro-5200), respectively. PL quantum yields (QYs) of diluted QD dispersions were assessed by absolute PL QY measurement system (C9920-02, Hamamatsu). The particle transmission electron microscopy (TEM) image of QDs was collected using a Tecnai G2 F20 operating at 200 kV. A powder X-ray diffraction (XRD) (Rigaku, Ultima IV) with Cu $K_\alpha$ radiation was used to analyze the crystallographic structure of QDs. A set of EL data such as EL spectra, CRI, luminuous efficacy, correlated color temperature (CCT), and CIE (Commission Internationale de l'Eclairage) color coordinates was collectively obtained in an integrating sphere with diode array rapid analyzer system (PSI Co., Ltd.).

Figure 4:
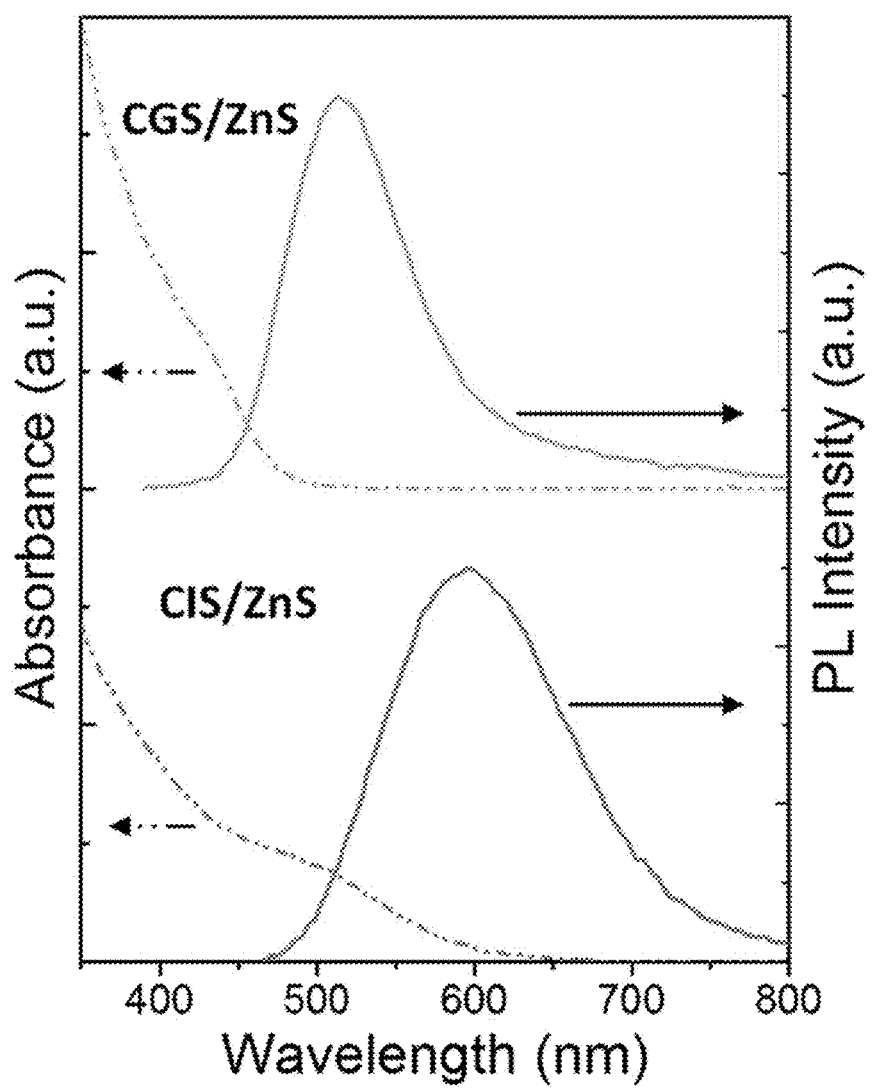
FIG. 4 shows absorption and PL spectra of green (514 nm) CGS/ZnS core/shell QDs and red (594 nm) CIS/ZnS core/shell QDs fabricated according to embodiments of the present disclosure.

Results:

FIG. 4 shows absorption and PL spectra of green (514 nm) CGS/ZnS core/shell QDs and red (594 nm) CIS/ZnS core/shell QDs fabricated according to embodiments of the present disclosure. The graph shows triple-shelled CGS/ZnS core/shell QDs (top) and double-shelled CIS/ZnS core/shell QDs (bottom). Both were synthesized under the same Cu deficient condition, i.e., Cu/Ga and Cu/In of 1/4 for the former and the latter, respectively. When observing CGS/ZnS core/shell QD and CIS/ZnS core/shell QD dispersions under UV irradiation, very bright fluorescence could be seen.

These CGS/ZnS core/shell QDs and CIS/ZnS core/shell QDs exhibited excellent absolute PL QYs of 85 and 83%, when measured with the excitation wavelengths of 370 and 450 nm, respectively. An off-stoichiometry between two cations in I-III-VI QDs can tailor their band gap to a certain extent. This has been experimentally substantiated in a model composition of CIS, showing a tendency of increasing band gap with Cu deficiency, which is likely associated with a lowering of valence band energy. As in CIS QDs, Cu/Ga off-stoichiometry affected the band gap and consequent PL of CGS ones in the same manner.

Figure 5:
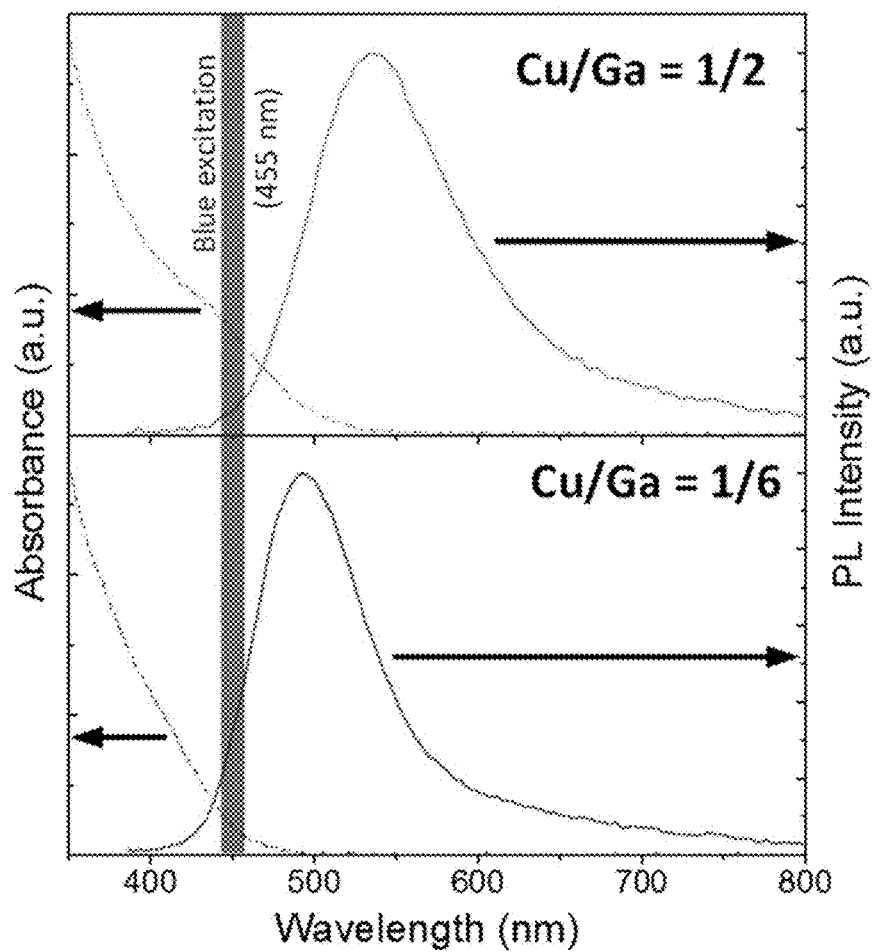
FIG. 5 shows absorption and PL spectra with different Cu/Ga ratios.

FIG. 5 shows absorption and PL spectra with different Cu/Ga ratios. The graph shows CGS/ZnS core/shell QDs with Cu/Ga precursor molar ratio of 1/2 (top), and CGS/ZnS core/shell QDs with Cu/Ga precursor molar ratio of 1/6 (bottom). In the graph, a blue excitation wavelength of 455 nm from a blue LED chip was marked with a thick solid line.

Referring to FIG. 5 together with FIG. 4, PL peak along with absorption onset of CGS/ZnS QDs consistently blue-shifted with a higher degree of Cu deficiency, i.e., from 536 nm for Cu/Ga=1/2 to 495 nm for Cu/Ga=1/6. Among a series of CGS/ZnS core/shell QDs with different Cu/Ga ratios, Cu/Ga=1/6-based ones having the shortest PL wavelength may be the most suitable downconverters in reducing the cyan gap adjacent to blue emission from LED chip.

However, the spectral overlap of absorption of Cu/Ga=1/6-based core/shell QDs with blue excitation was marginal, indicating that they could not efficiently downconverted by the present LED pumping source. Taking both aspects of minimal cyan gap and efficient QD excitation into account, Cu/Ga=1/4 composition was optimally chosen for the subsequent fabrication of high-color rendering, efficient white QD-LEDs.

It should be also noted that CGS core QDs were shelled triply with ZnS, while only double ZnS shelling was applied to CIS ones. In the course of ZnS shelling, CIS core QDs typically experience an appreciable alloying with ZnS, accompanying a progressive blue-shift in PL with shelling duration and/or repetition.

Figure 6:
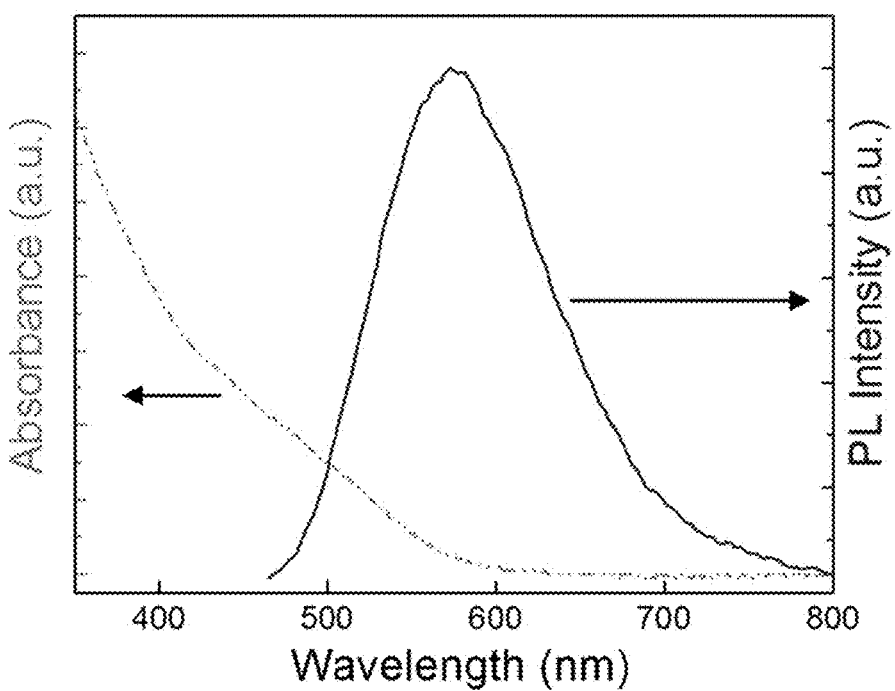
FIG. 6 shows absorption and PL spectra of CIS/ZnS core/shell QDs obtained after triple ZnS shelling was applied according to embodiments of the present disclosure.

FIG. 6 shows absorption and PL spectra of CIS/ZnS core/shell QDs obtained after triple ZnS shelling was applied according to embodiments of the present disclosure.

Referring to FIG. 6, when triple shelling was applied, PL peak of the resulting CIS/ZnS core/shell QDs markedly blue-shifted to 573 nm compared to that (594 nm) of double-shelled ones. Such ZnS shelling-accompanying alloying appears more predominant for CIS core QDs relative to CGS core QDs, which may be explained by a closer matching in ionic radius of $In^{3+}$ (9.4 Å) versus $Ga^{3+}$ (7.6 Å) with $Zn^{2+}$ (8.8 Å).

In the present disclosure, double-shelled CIS/ZnS core/shell QDs were selected instead of triple-shelled ones for white QD-LED fabrication, since they can provide a more distinct color separation from the complementary downconverters of Cu/Ga=1/4-based CGS/ZnS core/shell QDs above.

Figure 7:
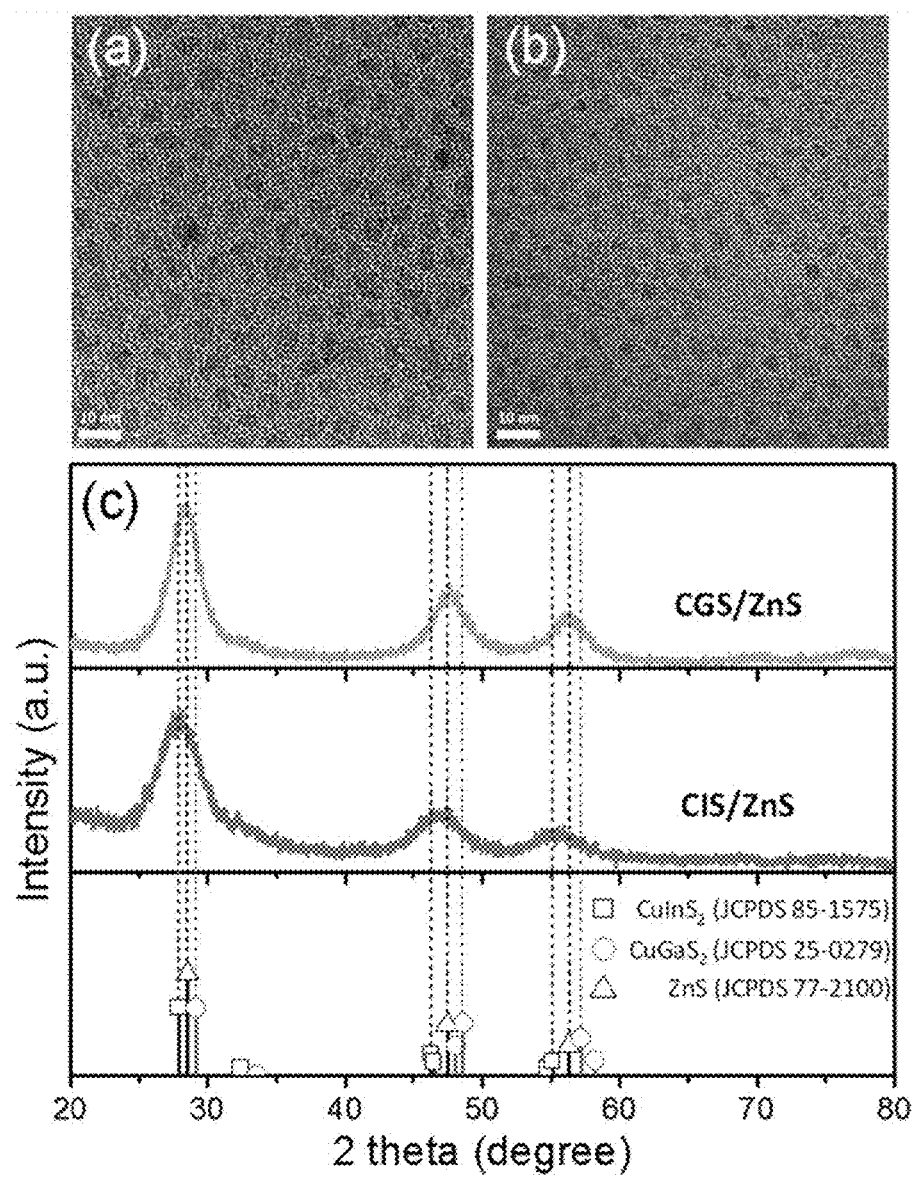
FIG. 7 shows (a) a TEM image of CGS/ZnS core/shell QDs, (b) a TEM image of CIS/ZnS core/shell QDs, and (c) comparison of XRD patterns of CGS/ZnS core/shell and CIS/ZnS core/shell QDs.

FIG. 7(a) is a TEM image of CGS/ZnS core/shell QDs with the average size of 6.1 nm, and FIG. 7(b) is a TEM image of CIS/ZnS core/shell QDs with the average size of 4.8 nm. The scale bar is 10 nm. FIG. 7(c) shows comparison of XRD patterns of CGS/ZnS core/shell QDs and CIS/ZnS core/shell QDs.

As can be seen from FIGS. 7(a) and 7(b), triple-shelled CGS/ZnS core/shell QDs exhibited a larger average size compared to that of double-shelled CIS/ZnS core/shell QDs and such a size difference is mainly attributable to the repetition of shelling. As marked in XRD patterns of FIG. 7(c), the reflection peaks of zinc blende ZnS are located between those of tetragonal chalcopyrite CGS and CIS. Upon ZnS shelling, overall reflection peaks of both CGS/ZnS core/shell QDs and CIS/ZnS core/shell QDs shifted to those of ZnS phase indicative of the proper formation of ZnS overlayer. Sharper full-width-at-half-maxima (FWHMs) of reflection peaks from CGS/ZnS core/shell QDs compared to CIS/ZnS core/shell QDs are a direct consequence of a larger size of the former ones by means of the formation of thicker ZnS shell aforementioned.

Figure 8:
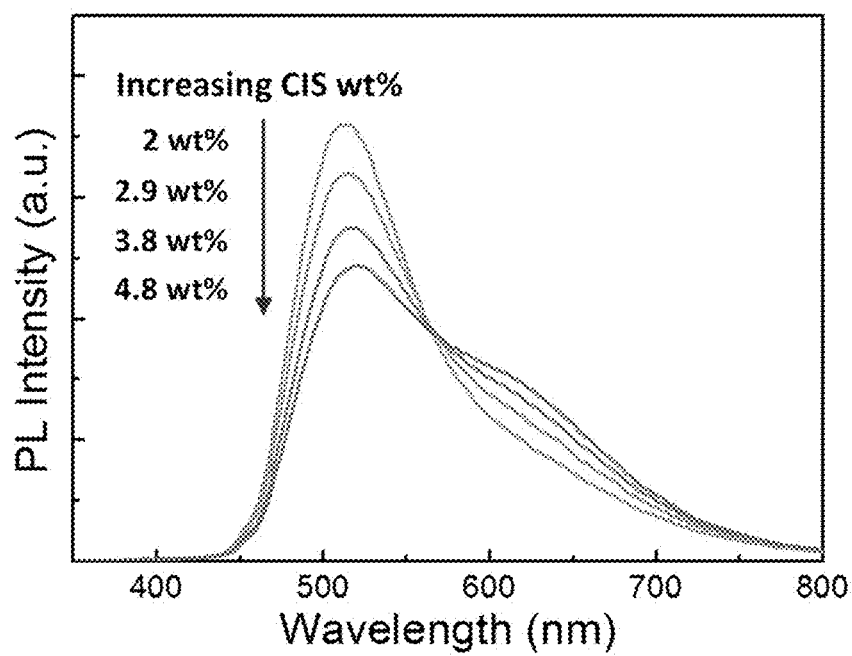
FIG. 8 shows PL spectra of QD-blended solutions with different ratios of CIS/ZnS core/shell QDs according to experimental example of the present disclosure.

FIG. 8 shows PL spectra of QD-blended solutions with four different ratios of 2, 2.9, 3.8, and 4.8 wt % CIS/ZnS core/shell QDs according to experimental example of the present disclosure.

The above two core/shell QDs of 514 nm-emitting CGS/ZnS and 594 nm-emitting CIS/ZnS were solution-blended. Referring to FIG. 8, with increasing CIS/ZnS core/shell QD content, red PL component became more noticeable, accompanying a steady reduction of green PL. As sensed from the substantial spectral overlap of PL of green CGS/ZnS core/shell QD with absorption of red CIS/ZnS one, the light reabsorption between these QDs in the blend solution would take place actively. Thus, one expects that red PL of CIS/ZnS core/shell QD results from the indirect excitation by green emission of CGS/ZnS core/shell QD in addition to the direct excitation. Using a blue LED chip, QD-LEDs were fabricated by applying the respective QD blend solutions above.

Figure 9:
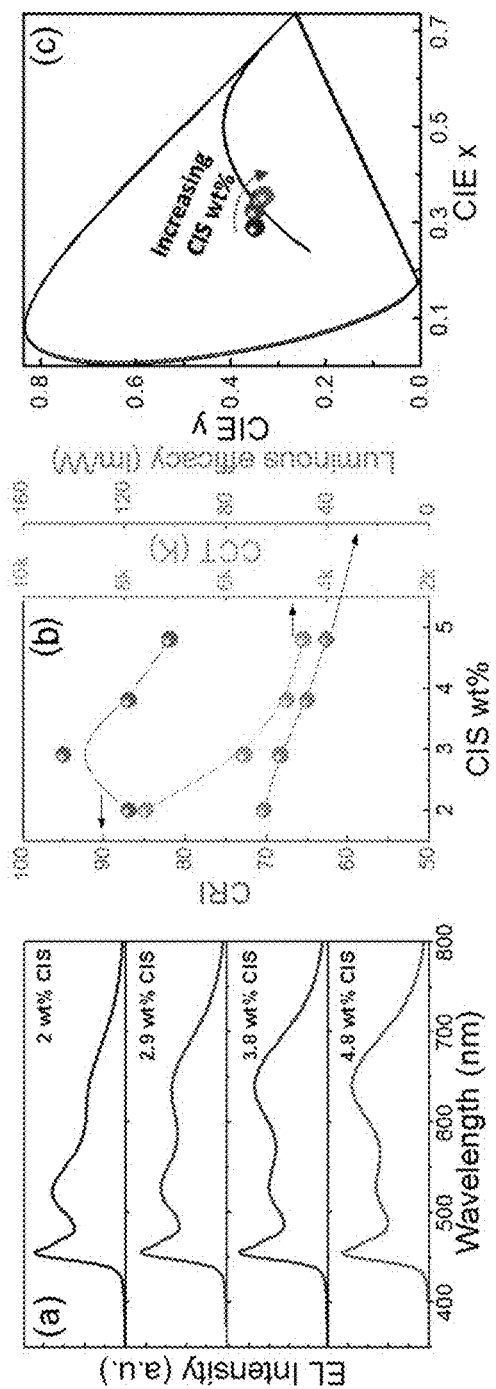
FIG. 9 shows (a) EL spectra, (b) variations of CRI, CCT and luminous efficacy, and (c) CIE color coordinates, for white QD-LEDs fabricated with different amounts of CIS/ZnS core/shell QDs according to experimental example of the present disclosure.

For white QD-LEDs fabricated with different weight ratios between CGS/ZnS core/shell QDs and CIS/ZnS core/shell QDs, FIG. 9(a) shows EL spectra, FIG. 9(b) shows variations of CRI, CCT and luminous efficacy, and FIG. 9(c) shows CIE color coordinates. EL spectra (a) and primary EL quantities (b,c) were collected at a forward current of 100 mA.

One can instantly notice a marked difference in the relative spectral distribution of two QD emitters between PL in FIG. 8 and EL in FIG. 9(a). In embodiments, CIS/ZnS core/shell QD-associated red components became more accentuated in EL relative to PL. Compared to the QDs in dispersion state, those packaged in LED mold are by far more concentrated. As the interacting QDs are in a closer proximity, the reabsorption of CGS/ZnS core/shell QD emission by CIS/ZnS one should become more efficient according to the dependence of its rate on $D^{-2}$ (D=inter-QD distance). In addition, nonradiative Förster resonance energy transfer (FRET) from CGS/ZnS core/shell QDs to CIS/ZnS core/shell QDs, where its rate scales as $D^{-6}$ should be also taken into account. Under the circumstance of compactly packaged QDs in LED, the inter-QD spacing would be so close as to be approximately in the range of the Förster radius (corresponding to a separation distance reaching 50% FRET efficiency). Therefore, the disparity in the QD spectral distribution of EL (FIG. 8) versus PL (FIG. 9(a)) can be attributed jointly to the light reabsorption enhancement and FRET emergence, as two interacting QDs were in a substantial proximity.

A cyan gap, one of the major spectral deficiencies in achieving high-color rendering property of blue LED-based white devices, could be effectively mitigated thanks to the appropriate wavelength and broad bandwidth of CGS/ZnS core/shell QD emitters as in FIG. 9(a)). The primary EL quantities of CRI, CCT, and luminous efficacy of white QD-LEDs with increasing red CIS/ZnS core/shell QD loading were compared in FIG. 9(b) and summarized in Table 1.

TABLE 1

| Sample | Luminous efficacy (lm/W) | CIE x | CIE y | CRI | CCT (K) |
| --- | --- | --- | --- | --- | --- |
| 2 wt % CIS | 65.3 | 0.290 | 0.349 | 87 | 7582 |
| 2.9 wt % CIS | 58.8 | 0.329 | 0.353 | 95 | 5654 |
| 3.8 wt % CIS | 48.2 | 0.349 | 0.340 | 87 | 4810 |
| 4.8 wt % CIS | 40.5 | 0.355 | 0.330 | 82 | 4486 |

When the 2.9 wt % CIS/ZnS core/shell QD blend was applied, the highest CRI of 95 was attainable. Increasing CIS/ZnS core/shell QD content in LED packaging naturally led to the spectral rise in red region (see FIG. 9(a)), yielding warmer white emissions. Specifically, with increasing CIS/ZnS core/shell QD content from 2 to 4.8 wt %, CCT was tunable from 7582 to 4486K, corresponding to CIE color coordinates from (0.290, 0.349) to (0.355, 0.330) (see FIG. 9(c)).

Luminous efficacy of white QD-LEDs was also found to be consistently dependent on CIS/ZnS core/shell QD content, showing a steady reduction from 65.3 for 2 wt % CIS/ZnS core/shell QD to 40.5 lm/W for 4.8 wt % CIS/ZnS core/shell QD. A photometric quantity of luminous flux (lm) is a function of the photopic sensitivity of the human eye, which is the highest in the green (i.e., 555 nm) region and becomes lower in a longer emission wavelength. Particularly, the deep red emissions with wavelengths longer than ca. 690 nm are not perceivable by the human vision and thus cannot contribute to luminous flux.

For this reason, the drop of luminous efficacy from white QD-LED with a higher CIS/ZnS core/shell QD loading is attributable mainly to the increasing red spectral contribution in the overall EL spectrum.

Figure 10:
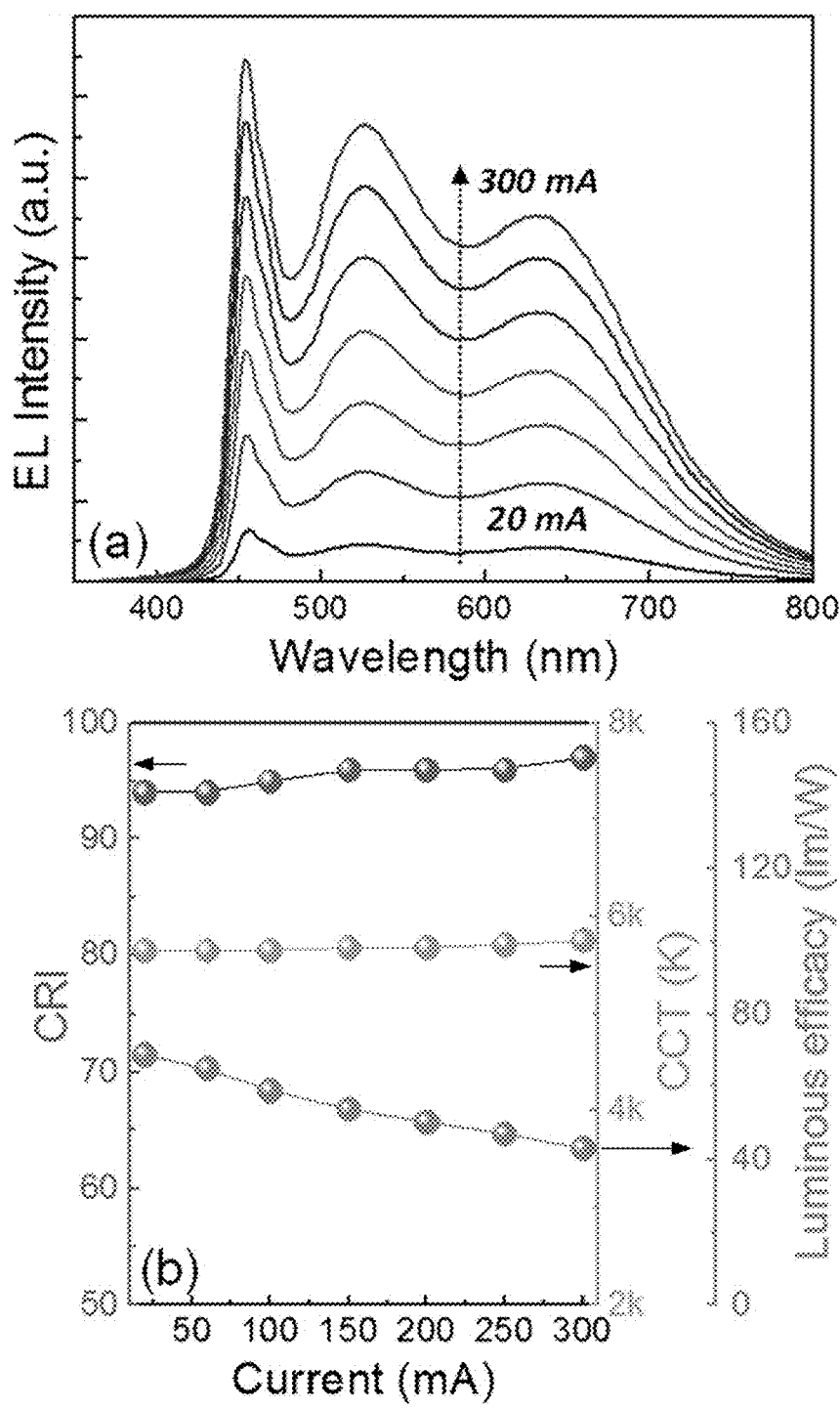
FIG. 10 shows driving current-dependent (a) EL spectral evolution, and (b) variations of CRI, CCT, and luminous efficacy of 2.9 wt % CIS/ZnS core/shell QD-based white QD-LED.

FIG. 10 shows driving current-dependent (a) EL spectral evolution, and (b) variations of CRI, CCT, and luminous efficacy of 2.9 wt % CIS/ZnS core/shell QD-based white QD-LED.

Referring to FIG. 10(a), shown is EL spectral evolution of white QD-LED with the highest CRI as a function of applied current. The accompanying variations of CRI, CCT, and luminous efficacy are plotted in FIG. 10(b) and summarized in Table 2.

TABLE 2

| Current (mA) | Luminous efficacy (lm/W) | CIE x | CIE y | CRI | CCT (K) |
|---|---|---|---|---|---|
| 20 | 68.8 | 0.329 | 0.348 | 94 | 5654 |
| 60 | 64.9 | 0.329 | 0.351 | 94 | 5651 |
| 100 | 58.8 | 0.329 | 0.353 | 95 | 5654 |
| 150 | 53.7 | 0.328 | 0.356 | 96 | 5686 |
| 200 | 50.2 | 0.328 | 0.357 | 96 | 5686 |
| 250 | 47.2 | 0.328 | 0.358 | 96 | 5719 |
| 300 | 43.1 | 0.326 | 0.358 | 97 | 5752 |

Figure 11:
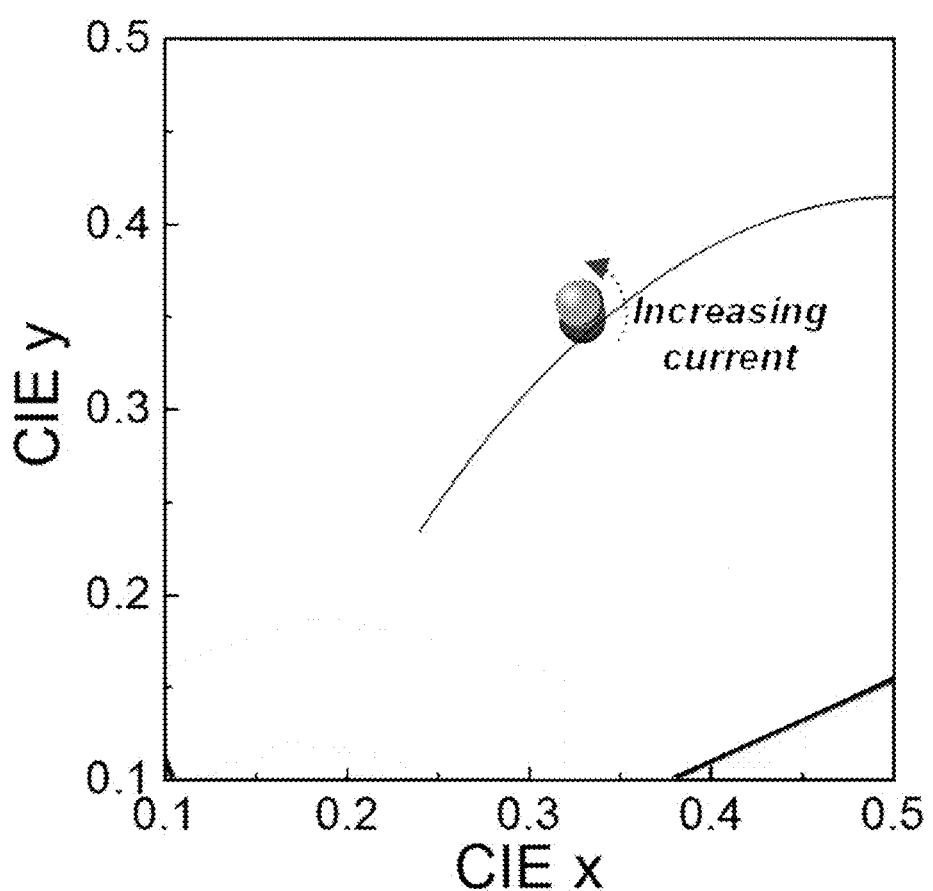
FIG. 11 shows variation of CIE color coordinates of 2.9 wt % CIS/ZnS core/shell QD-based white QD-LED with increasing applied current from 20 to 300 mA.

Furthermore, FIG. 11 shows variation of CIE color coordinates of 2.9 wt % CIS/ZnS core/shell QD-based white QD-LED with increasing applied current from 20 to 300 mA.

Referring to Table 2 and FIG. 11, it exhibits relatively narrow distributions of 94-97 in CRI, 5651-5752K in CCT, and (0.326-0.329, 0.348-0.358) in CIE color coordinates (Table S2, FIG. S2) in the operating current range of 20-300 mA. Meanwhile, its luminous efficacy became appreciably decreased from 68.8 lm/W at 20 mA to 43.1 lm/W at 300 mA. A universal trend of such a reduction in luminous efficacy is primarily correlated to the intrinsic efficiency drop of LED chip itself, which becomes intensified at a higher driving current regime.

Moreover, taking a considerable heat released from a LED chip junction that leads to a temperature rise proportional to an applied current into account, both emissions of CGS/ZnS core/shell QDs and CIS/ZnS core/shell QDs in LED package would become thermally quenched by means of the thermal emptying of radiative intra-gap states. Thermal quenching behaviors of CGS/ZnS core/shell QDs and CIS/ZnS core/shell QDs were directly observable by heating QD-resin mixture on glass substrate and monitoring their PL.

Figure 12:
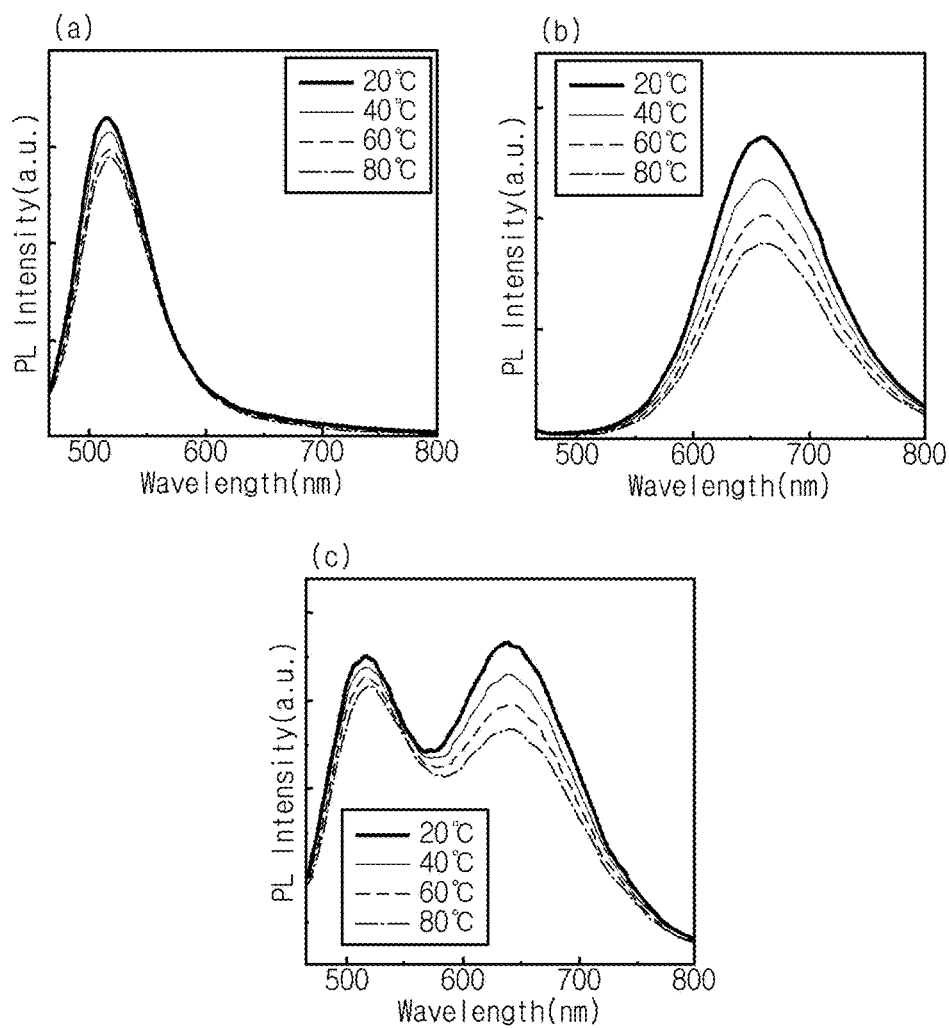
FIG. 12 shows changes of PL intensity of QD-resin mixture on glass substrate with increasing heating temperature from 20 to 100° C.; in which (a) shows CGS/ZnS core/shell QDs only, (b) shows CIS/ZnS core/shell QDs only, and (c) shows blended QDs of CGS/ZnS core/shell QD+CIS/ZnS core/shell QD.

FIG. 12 shows changes of PL intensity of QD-resin mixture on glass substrate with increasing heating temperature from 20 to 100° C.; FIG. 12(a) shows CGS/ZnS core/shell QDs only, FIG. 12(b) shows CIS/ZnS core/shell QDs only, and FIG. 12(c) shows blended QDs of CGS/ZnS core/shell QD+CIS/ZnS core/shell QD. Even though the degree of PL quenching somewhat differed by the type of QD, the PL intensity is lowered with the increasing temperature.

Thus, those two factors would be jointly responsible for the gradual drop of device efficacy at a higher current.

As mentioned above, from the results of Yoon et al., the white QD-LED according to embodiments of the present disclosure was obtained, with quantity comparable to the highest quantity (i.e., 97) to date reported from white QD-LED with the QD combination of green ZAIS (501 nm) and red ZCIS (606 nm). Meanwhile, the white QD-LED with the QD combination of green ZAIS (501 nm) and red ZCIS (606 nm) has the maximum luminous efficacy of 39.6 lm/W, while the white QD-LED according to embodiments of the present disclosure possesses 64.9 lm/W that far surpasses in luminous efficacy. Such a large gap in luminous efficacy by about two times would result primarily from substantially higher QYs of CGS/ZnS core/shell QDs and CIS/ZnS core/shell QDs of the present disclosure (85 and 83%, respectively) versus ZAIS and ZCIS ones (61 and 53%, respectively).

For the ultimate fabrication of near-ideal high-color rendering white QD-LED, the present disclosure proposes two I-III-VI type QDs, green CGS/ZnS core/shell QDs and red CIS/ZnS core/shell QDs. Bearing white spectral balance and QD excitation by a blue LED in mind, fabricating methods of green CGS/ZnS core/shell QDs and red CIS/ZnS core/shell QDs were individually tuned, resulting in 514 and 594 nm in peak emission wavelength, respectively, with excellent QYs>80% after elaborate ZnS shelling. A novel combination of these two QD emitters with a broad PL nature could provide a balanced white spectral distribution, when they were integrated with a blue LED, by means of their distinct color separation along with the effective mitigation of cyan gap. By varying a weight ratio between CGS/ZnS core/shell QDs and CIS/ZnS core/shell QDs from 2 to 4.8 wt % CIS/ZnS core/shell QDs and copackaging them in a single blue LED, a series of tricolored white QD-LEDs was fabricated, yielding weight ratio-dependent distributions in EL quantities such as 82-95 in CRI, 4486-7582K in CCT, and 40.5-65.3 lm/W in luminous efficacy at a driving current of 100 mA. The QD-LED with QD formulation of 2.9 wt % CIS/ZnS core/shell QDs produces relatively stable white emissions against current variation with 94-97 in CRI and 5651-5752K in CCT in the range of 20-300 mA, although its luminous efficacy decreased somewhat markedly with increasing current from 68.8 lm/W at 20 mA to 43.1 lm/W at 300 mA.

Figure 13:
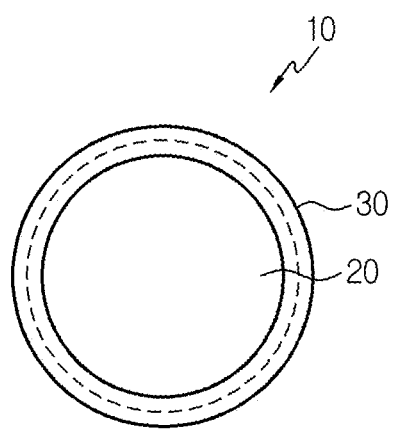
FIG. 13 is a schematic diagram of blue-emitting QD according to embodiments of the present disclosure.

FIG. 13 is a schematic diagram of blue-emitting QD according to embodiments of the present disclosure.

Referring to FIG. 13, the present disclosure proposes blue emission-capable non-Cd type QD 10. The QD 10 includes I-III-VI type quaternary Zn—Cu—Ga—S (hereinafter, ZCGS) or Cu—Ga—Al—S core QD 20 and ZnS shell 30.

In an embodiment, the core QD 20 according to embodiments of the present disclosure is ZCGS composition. The ZnS shell 30 formed by ZnS coating on the core QD 20 improves PL and QY.

The inventors found out that Cu, Ga and S are indispensable for blue emission, I-III-VI type QDs, i.e., Cu—Ga—S (hereinafter CGS) is essential, and in particular, a chemical composition should be adjusted to a Cu/Ga ratio of 1:10 to 1:1, namely, the amount of Cu is equal to the amount of Ga or is slightly deficient (off-stoichiometry). Furthermore, the inventors found out that ZCGS obtained by Zn alloying into CGS or Cu—Ga—Al—S obtained by Al alloying into CGS possesses blue emission. The Cu/Ga ratio of 1/10 or above exhibits blue emission through Zn or Al addition, and the Cu/Ga ratio exceeding 1 does not exhibit blue emission.

Furthermore, ZCGS composition preferably has Cu:(Zn+Ga) of 1:10 to 1:1, and Cu—Ga—Al—S composition preferably has Cu:(Ga+Al) of 1:10 to 1:1. Particularly, each composition has Zn:Ga=(1−x):x and Al:Ga=(1−x):x where 0.5<x<1. The adjustment of a compositional ratio between Ga and Zn or Al as a partial substitute for Ga is performed for adjusting the wavelength properties, but adjusting a ratio of Ga/Zn or Al while adjusting the Cu/Ga ratio is a unique feature of the present disclosure. Under these composition conditions, the quaternary core QD can possess blue emission.

The ZnS shell 30 may be multiple, for example, double or triple. In embodiments, as shown, ZnS shell is formed up to the part indicated by the dashed line first, and then the remaining ZnS shell is formed up to the part indicated by the solid line. Particularly, as described below, the ZnS shelling process is continuously performed, so there is no substantial layer separation in the ZnS shell 30. Each layer may have different compositions. The composition may change discontinuously based on the dashed line, and may change continuously over the entire ZnS shell 30. The ZnS multi-shell 30 provides excellent passivation effects. Accordingly, QY of the QD 10 can be improved.

As such, according to embodiments of the present disclosure, the use of the QD 10 including ZCGS or Cu—Ga—Al—S core QD 20 and ZnS shell 30 can yield blue emission. Furthermore, high QY can be achieved.

The core QD 20 may be fabricated through a hot colloid method, a solvothermal method, heating-up or hot-injection, and the ZnS shell 30 may be performed by a cation exchange process and a solvothermal method, and another embodiment of a fabricating method will be described below.

Figure 14:
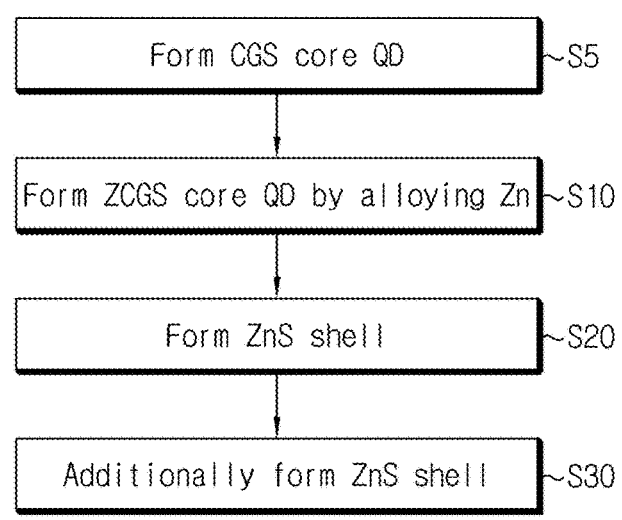
FIG. 14 is a flowchart showing another embodiment of a method for fabricating QDs according to embodiments of the present disclosure.

FIG. 14 is a flowchart showing another embodiment of a method for fabricating QDs according to embodiments of the present disclosure. Because the case of the formation of Cu—Ga—Al—S core QD is the same as the case of the formation of ZCGS core QD except Al alloying, the following embodiment is described, taking the case of the formation of ZCGS core QD as an example.

A blend solution prepared by mixing precursors of Cu, Ga and S, sulfur, and solvent is heated to grow CGS core QD first (S5).

Generally, A-In—X (A=Cu, Ag, X=S, Se) is among the most studied I-III-VI ternary compositions for synthesis of visible QDs typically showing lower-energy emissions than green color. In the present disclosure, ternary CGS core QD emitting in the cyan-to-azure range is first synthesized by choosing CGS with a much higher bulk band gap of 2.43 eV than those of the above compositions and attaining short emission wavelengths below 500 nm through Cu/Ga stoichiometric control.

The starting materials for growing CGS core QD may be a basic combination of CuI as copper precursor, GaI as gallium precursor, 1-dodecanethiol as sulfur precursor, sulfur, and oleylamine as solvent.

A ratio of the starting materials ranges Cu:Ga=1:10 to 1:1 as previously mentioned. The copper precursor may include CuI as well as copper acetate, copper bromide, and copper chloride. The gallium precursor may include GaI as well as gallium acetate, gallium chloride, and gallium acetylacetonate. The sulfur precursor may include 1-dodecanethiol as well as various alkyl thiols such as octanethiol, hexadecanethiol and decanethiol. The solvent may include oleylamine as well as various fatty amines such as dodecylamine and trioctylamine.

Heating of the blend solution may be performed through a plurality of steps. First, degassing may be performed in the course of heating to 120° C. Subsequently, the growth temperature may be increased to 240° C. In this instance, $N_2$ purging may be performed.

Subsequently, alloying of Zn into the CGS core QD with an addition of Zn precursor forms quaternary ZCGS core QD 20 (S10).

Synthesis of ZCGS core QD 20 by alloying of Zn into the CGS core QD (host) fabricated at the previous step can achieve high energy or short emission wavelengths in the azure-blue range.

The Zn precursor used may be $ZnCl_2$ and zinc acetate.

Cu—Ga—Al—S core QD is formed under the nearly same synthesis conditions (reaction temperature, reaction solvent, reaction time, etc.) as those of ZCGS core QD, except that Al precursor is used instead of Zn precursor. The Al precursor includes aluminum iodide, aluminum chloride, and aluminum acetate.

After the core QD 20 is formed, ZnS stock solution is applied onto the core QD 20 to form the ZnS shell 30 (S20, S30).

The ZnS shelling step includes S20 and S30, and may be performed continuously two or more times. In this instance, each step may differ in concentration of the ZnS stock solution and reaction temperature and time. The second reaction may have higher temperature or longer time.

For example, ZnS stock solution is primarily applied to a result having the core QD 20 to form ZnS shell at S20, and another ZnS stock solution is applied to the result to additionally form ZnS shell at S30, which is succeeded by S20.

Each of S20 and S30 may include sub-steps, and two or more shelling processes may be performed.

For example, the first ZnS stock solution at S20 may be prepared with a basic combination of zinc acetate as Zn precursor and octadecene and oleic acid as solvent. In this instance, the zinc precursor may include zinc acetate as well as zinc stearate, zinc oxide, zinc nitride, and zinc acetylacetonate, and the oleic acid may include stearic acid and myristic acid. In the first ZnS shelling at S20, the reaction temperature may range 200° C. to 280° C. and the reaction time may range 1 min to 2 h. Preferably, the reaction at the temperature of 240° C. is retained for 1 h 15 min.

The second ZnS stock solution at S20 may be prepared with a basic combination of zinc acetate as Zn precursor and octadecene and oleic acid as solvent in the same way as the first ZnS stock solution, but at different concentration. The second ZnS shelling reaction temperature at S20 may be the same as the first ZnS reaction temperature, and the reaction time may be shorter than the first ZnS reaction time. Preferably, the reaction is retained at the temperature of 240° C. for 30 min.

Another ZnS stock solution at S30 is of different type from the first and second ZnS stock solutions at S20. For example, the ZnS stock solution may be prepared with a basic combination of zinc stearate as Zn precursor, 1-dodecanethiol as sulfur precursor, and octadecene as solvent. In this instance, the zinc precursor may include zinc stearate as well as zinc acetate, zinc oxide, zinc nitride and zinc acetylacetonate, and the sulfur precursor may include other alkyl thiols.

In the ZnS shelling at S30, the reaction temperature may range 180° C. to 300° C., and the reaction time may range 1 min to 24 h. In the reaction at S30, the temperature may be higher than S20, or the time may be longer than S20. Preferably, the final reaction for another ZnS shelling may be retained at 250° C. for 1 h.

QYs of QDs after ZnS shelling according to the experimental method as described below reach 78-83%, yielding results that cannot be achieved by InP QDs with similar emission wavelengths. Hereinafter, specific experimental examples are described to explain the present disclosure in further detail.

Generally, the intentional off-stoichiometry between two cations (Cu, In) in Cu—In—S composition appreciably affects their band gap. Specifically, a higher degree of Cu deficiency relative to In ion results in a higher band gap, since it may lower the valence band maximum through a weakened repulsion between Cu d and S p orbitals, widening the band gap. As a result of carrying out the following experiments with different Cu/Ga off-stoichiometric ratios of 1/4, 1/5, and 1/8 according to embodiments of the present disclosure, such an efficacy of Cu deficiency on band gap control was indeed observed in CGS composition.

Experimental Method:

For a typical synthesis of ternary Cu-deficient CGS core QDs with Cu/Ga precursor molar ratios of 1/4, 1/5, or 1/8, 0.125, 0.1, or 0.0625 mmol of CuI (99.999%), 0.5 mmol of GaI (99.99%) and 1 mmol of sulfur (99.998%) were mixed in three-neck flask with 1.5 mL of 1-dodecanethiol (DDT, ≥98%) and 5 mL of oleylamine (OLA, 70%). Then, the mixture was degassed in the course of heating to 120° C. and further heated under $N_2$ purging to a growth temperature of 240° C. The reaction was maintained at that temperature for 5 min for growth of core QDs.

Following the above synthetic procedure, a series of quaternary ZCGS core QDs were synthesized by choosing a Cu/Ga ratio of 1/8 and additionally including different $ZnCl_2$ (≥98%) amounts of 0, 0.25, 0.5, 1.0, and 1.5 mmol, corresponding to Zn/Cu precursor molar ratios of 0, 4, 8, 16, and 24, respectively. All ternary and quaternary core QDs were then identically subjected to the following multiple-shelling reaction.

The first ZnS shell stock solution, prepared by dissolving 8 mmol of Zn acetate (reagent grade) in 8 mL of oleic acid (OA, 90%) and 4 mL of 1-octadecene (ODE, 90%), was introduced slowly to the core QD growth solution at 240° C. and the reaction was allowed for 1 h 15 min.

Subsequently, the second ZnS stock solution, consisting of 4 mmol of Zn acetate, 4 mL of OA, 2 mL of DDT, and 2 mL of ODE, was slowly injected, followed by 30 min-reaction at the same temperature. After that, another ZnS solution containing 4 mmol of Zn stearate (10-12% Zn basis), 4 mL of ODE, and 2 mL of DDT was again injected and this final shelling reaction was retained at 250° C. for 1 h. As-reacted QDs were then subjected to the precipitation with an excess of ethanol and purification with a solvent combination of hexane/ethanol by centrifugation (9000 rpm, 10 min), and finally redispersed in hexane, followed by analysis including spectra measurement.

Figure 15:
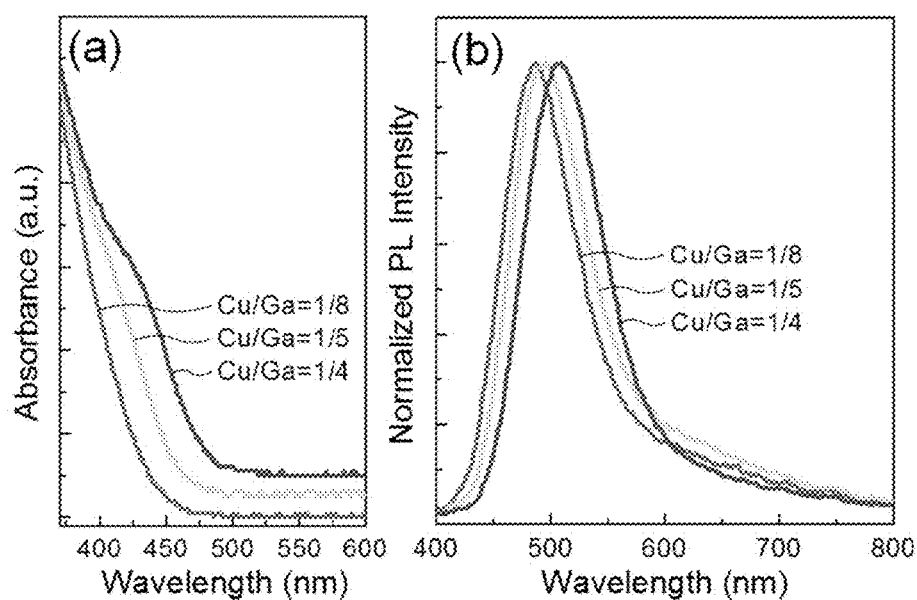
FIG. 15 shows (a) absorption and (b) normalized PL spectra of cyan-to-azure-emitting Cu-deficient CGS/ZnS core/shell QDs synthesized with Cu/Ga precursor molar ratios of 1/4, 1/5, and 1/8.

Results:

FIG. 15 shows (a) absorption and (b) normalized PL spectra of cyan-to-azure-emitting Cu-deficient CGS/ZnS core/shell QDs synthesized with Cu/Ga precursor molar ratios of 1/4, 1/5, and 1/8.

Referring to FIG. 15(a), as compared in UV-visible absorption spectra of a series of Cu-deficient CGS/ZnS core/shell QDs obtained under the identical ZnS shelling reaction, the spectra consistently blueshifted with more Cu/Ga off-stoichiometry, i.e., in the order of the molar ratios of 1/4, 1/5, and 1/8. Unlike the above II-VI and III-V QDs with an excitonic transition, the radiative recombination of photoexcited charges of I-III-VI ones is governed by defect-related intragap states, inherently accompanying broad emission bandwidths, e.g., typically 100±20 nm.

FIG. 15(b) shows Cu/Ga ratio-dependent evolution of normalized PL spectra of CGS/ZnS core/shell QDs, corresponding to cyan-to-azure colors with more Cu deficiency, i.e., in the order of the molar ratios of 1/4, 1/5, and 1/8. All PL spectra comprise dominant high-energy emissions and marginal lower-energy tail ones.

Figure 16:
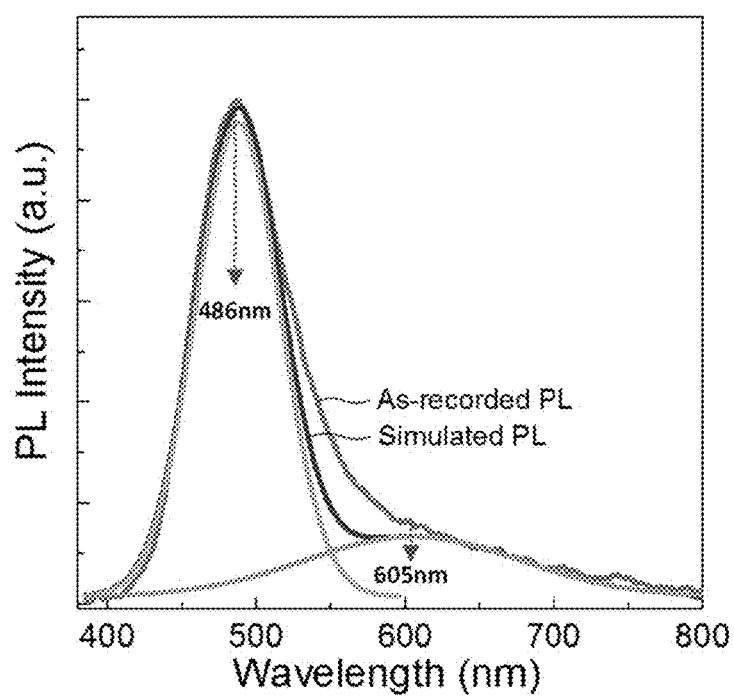
FIG. 16 shows as-recorded versus simulated PL of a representative CGS/ZnS QD sample with Cu/Ga=1/8.

FIG. 16 shows as-recorded versus simulated PL of a representative CGS/ZnS QD sample with Cu/Ga=1/8. The representative azure-emitting CGS/ZnS QD sample with Cu/Ga=1/8 can be resolved into two emission components as shown in FIG. 4. A high-energy emission component (peaking at 486 nm) likely originates from the radiative recombination of electron in conduction band (CB) with hole trapped in Cu vacancy ($V_{Cu}$) acceptor-derived state.

And a lower-energy tail emission with a peak wavelength of 605 nm can be assigned to donor-acceptor pair (DAP) recombination, where two plausible defects of Ga substituted at Cu site ($Ga_{Cu}$) and/or $Zn_{Cu}$ (presumably developed in the course of ZnS shelling and thus situated at/near the core surface) may serve as donor levels. Regardless of Cu/Ga ratio, all CGS/ZnS QDs possessed outstanding absolute QYs over 80%, specifically showing 86, 82, and 81% from the samples with 1/4, 1/5, and 1/8 in that ratio.

To further push the emission to a higher energy side, alloying of Zn ion into Cu/Ga=1/8-based CGS host with the shortest emission wavelength has been implemented in the stage of core reaction simply by adding different Zn precursor amounts of 0-1.5 mmol.

On the basis of close similarity in crystal structure between CGS (chalcopyrite tetragonal) versus ZnS (zinc blende) phase with similar lattice parameters of 5.35 and 5.40 Å, respectively, CGS-ZnS alloying likely occurs. Particularly, in this alloying $Zn^{2+}$ ion would preferentially substitute $Cu^+$ rather than $Ga^{3+}$, based on the comparison of their ionic radii, i.e., 9.1 Å ($Cu^+$), 7.6 Å ($Ga^{3+}$), and 8.8 Å ($Zn^{2+}$).

Figure 17:
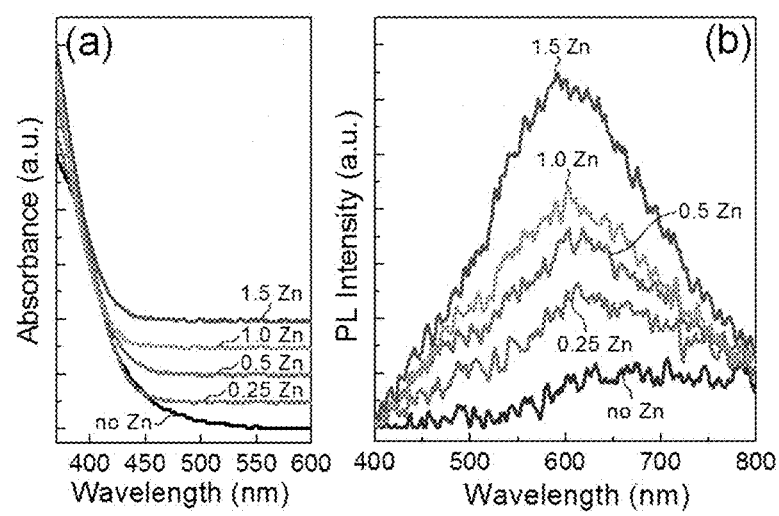
FIG. 17 shows (a) absorption and (b) PL spectra of a series of ZCGS core QDs synthesized with different Zn precursor amounts of 0, 0.25, 0.5, 1.0, and 1.5 mmol.

FIG. 17 shows absorption and (b) PL spectra of a series of ZCGS core QDs synthesized with different Zn precursor amounts of 0, 0.25, 0.5, 1.0, and 1.5 mmol.

As compared in FIG. 17(a), absorption spectra of ZCGS core QDs steadily blueshifted i.e., from no Zn to 1.5 Zn with increasing Zn content, indicating that Zn alloying indeed took place. To determine the optical band gaps of the individual ZCGS QDs, absorption spectra were converted into Tauc plots through $(Ahv)^2$-hv relation (where A is the absorbance, h is Planck's constant, and v is the light frequency), and the results such as FIG. 18 were obtained.

Figure 18:
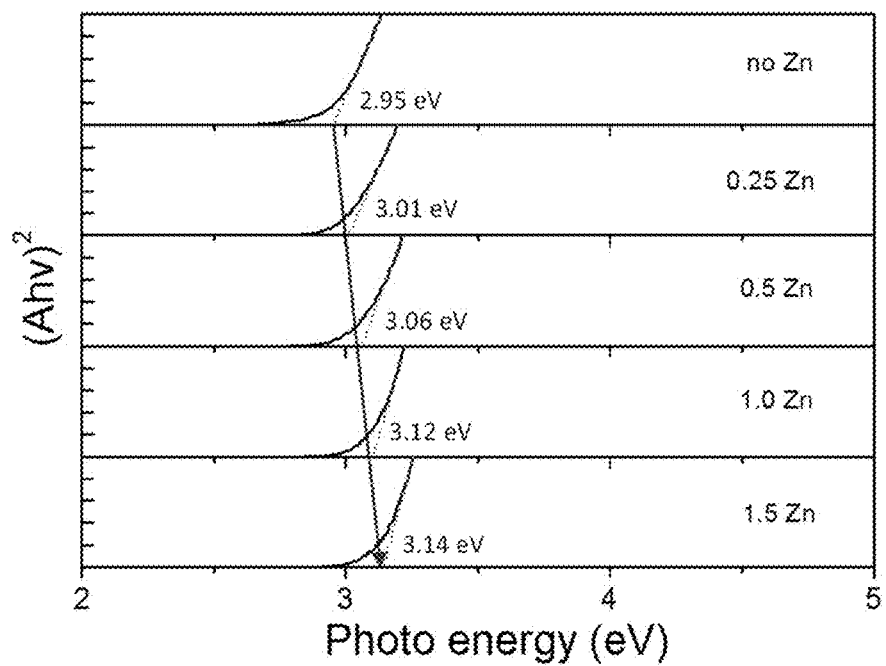
FIG. 18 shows a result of creating a Tauc plot for absorption spectra of ZCGS core QDs synthesized with different Zn precursor amounts of 0, 0.25, 0.5, 1.0, and 1.5 mmol.

Referring to FIG. 18, it can be seen that the band gap increases from 2.95 to 3.14 eV with increasing Zn amount added.

Referring to FIG. 17(b), unlike almost nonfluorescent CGS QDs in literature, the present CGS ones exhibited some detectable PLs even prior to ZnS shelling. Such low-energy and highly broad PLs are ascribable to the DAP recombination aforementioned. As seen in FIG. 17(b) showing as-recorded PL spectra of a series of ZCGS QD dispersions with the identical optical density of 0.05 at 370 nm, PL intensity was monotonically proportional to Zn amount added, i.e., 2% from CGS to 7% from 1.5 mmol Zn-based ZCGS QDs in QY.

On the basis of absorption and PL results in FIG. 17 above, it can be surmised that among Zn amount introduced in core QD reaction only a small portion participates in the formation of ZCGS alloyed phase and some of the remaining part adjunctively functions as shell precursor for the passivation of core surface by very partially formed ZnS shell.

Figure 19:
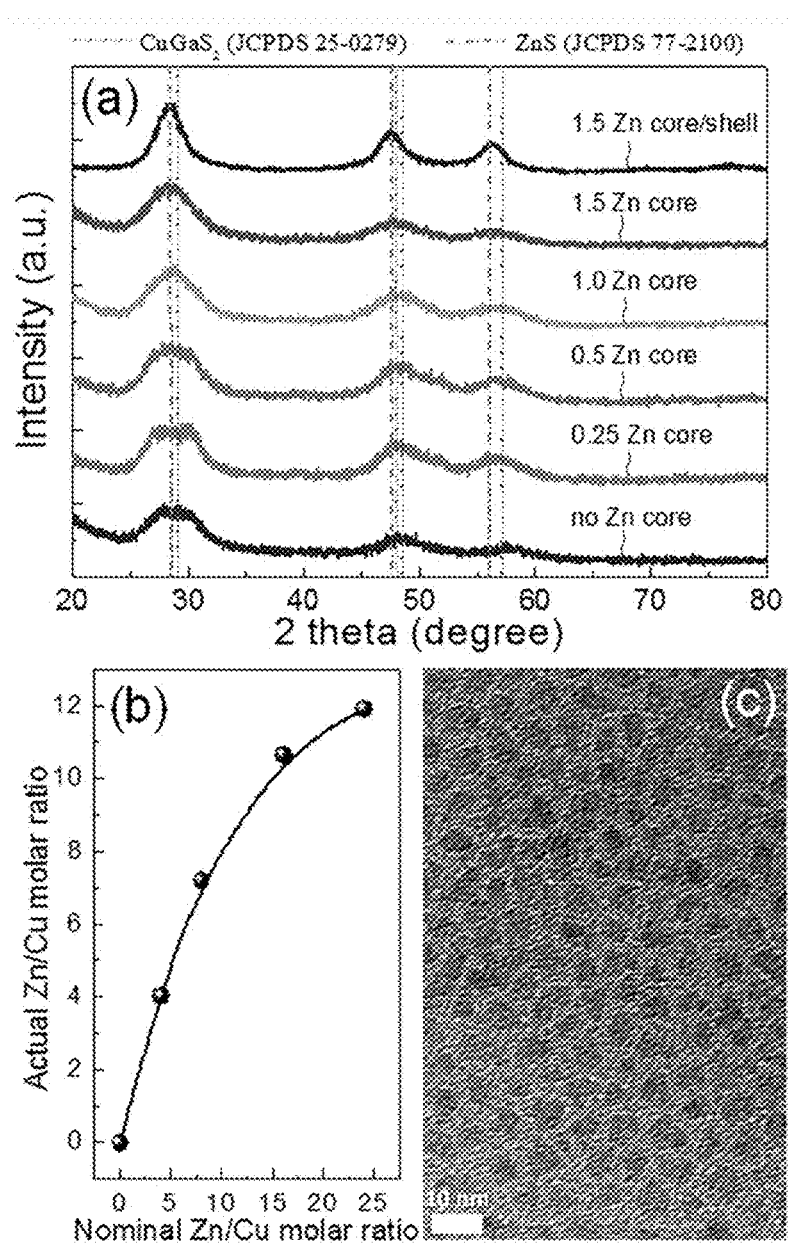
FIG. 19 shows (a) XRD patterns of ZCGS core QDs synthesized with different Zn precursor amounts, (b) actual vs. nominal Zn/Cu molar ratios from ICP results. For comparison, XRD patterns of ZCGS/ZnS core/shell QDs with 1.5 mmol Zn were included in (a) of FIG. 19.

FIG. 19(a) presents the comparison of X-ray diffraction (XRD) patterns of Zn amount-varied ZCGS core QDs along with representative ZCGS/ZnS core/shell QDs with 1.5 mmol of Zn. Although highly broad reflection peaks resulting from tiny sizes of core QDs render accurate assessment of crystal structure difficult, all ZCGS QDs may be identically assigned to archetypal tetragonal chalcopyrite phase. Minute shift of reflection peaks of a series of ZCGS QDs to a smaller 2θ side with increasing Zn amount is a result of combined effects of Zn alloying into CGS host and ZnS shell partially formed on core surface, being also consistent with the earlier absorption and PL spectra shown in FIG. 17. Meanwhile, in the case of ZCGS/ZnS QDs, the reflection peaks became nearly identical to those of zinc blende ZnS phase along with notably narrower full-width-at-half-maxima (FWHMs) indicative of the proper deposition of a few monolayer-thick ZnS overlayer.

FIG. 19(b) shows actual vs. nominal Zn/Cu molar ratios from ICP results. Actual Zn/Cu molar ratios of a series of ZCGS core QDs were assessed by an inductively coupled plasma analysis and found to be smaller than their nominal values. Again, such Zn species detected comes from both its internal (i.e., Zn-alloyed CGS core QD) and external presence (i.e., partially formed ZnS shell).

Transmission electron microscopy (TEM) work was performed on all core/shell QDs, but their size and shape were practically the same each other. FIG. 19(c) is a high-resolution TEM image of 1.5 mmol Zn-based ZCGS/ZnS core/shell QD shown in FIG. 19(a) (scale bar: 10 nm), showing nearly spherical-shaped particles with an average size of 4.8 nm.

Figure 20:
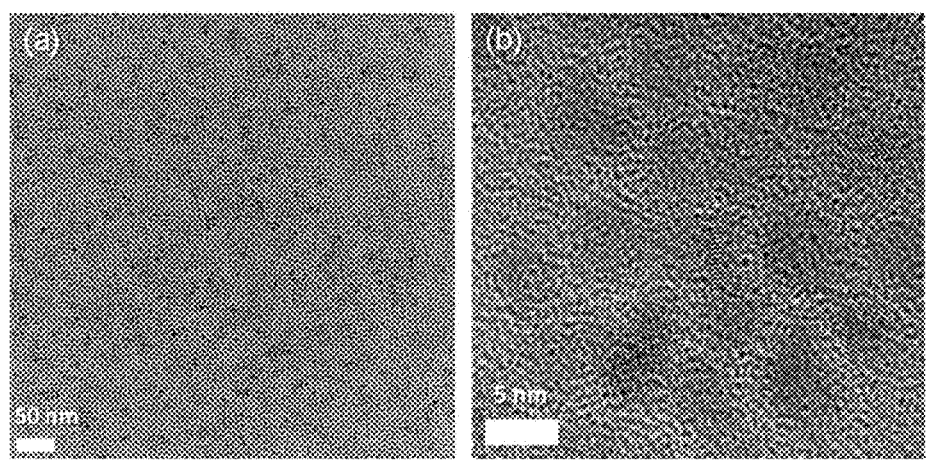
FIG. 20 shows (a) a low-resolution TEM image of 1.5 mmol Zn-based ZCGS/ZnS core/shell QD (scale bar: 50 nm), and (b) a high-resolution TEM image (scale bar: 5 nm).

FIG. 20(a) is a low-resolution TEM image of 1.5 mmol Zn-based ZCGS/ZnS QD (scale bar: 50 nm), and FIG. 20(b) is a high-resolution TEM image (scale bar: 5 nm). Referring to FIG. 20(a), a well compact QD array with a high degree of monodispersity is observed from lower-magnification of TEM image, and clear lattice fringes of individual QDs indicative of high degree of crystallinity are also seen from a higher-magnification one of FIG. 20(b).

Figure 21:
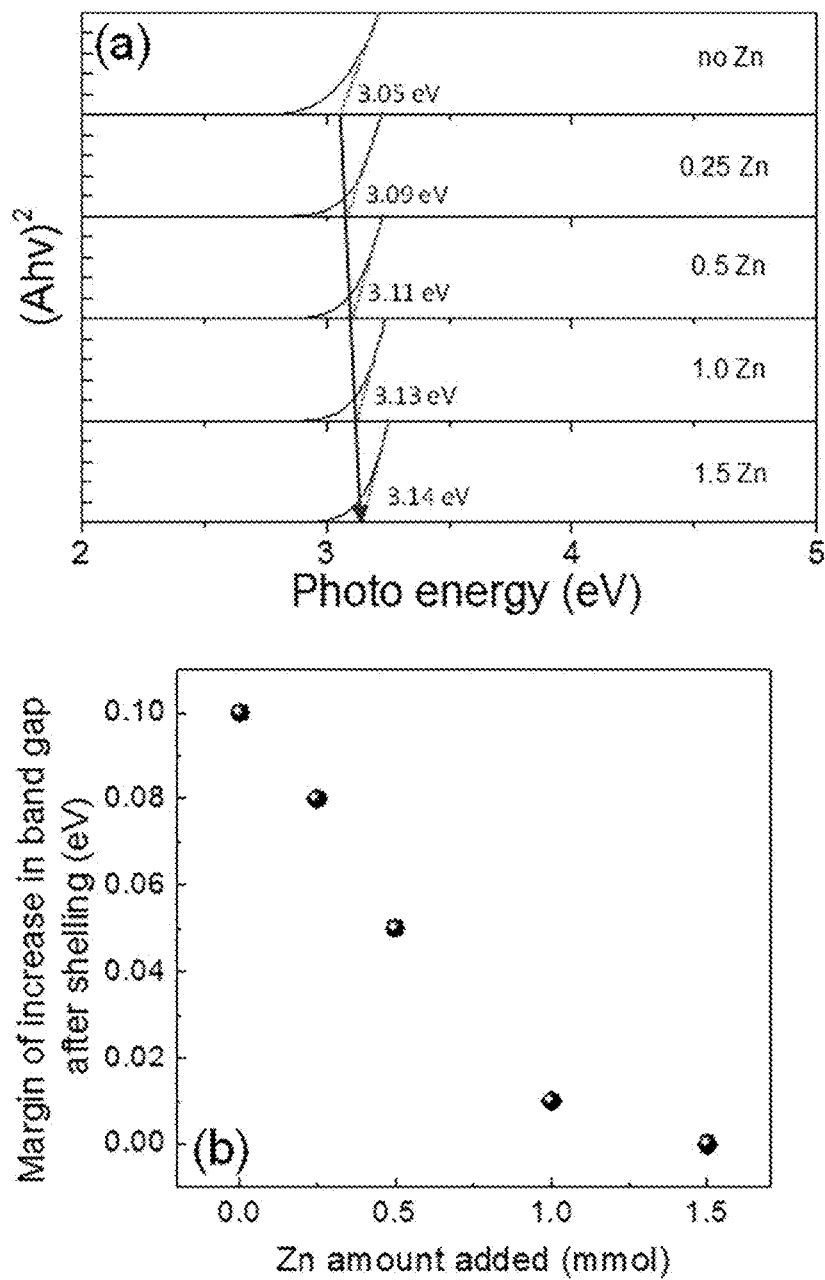
FIG. 21 shows (a) $(Ah\nu)^2$-$h\nu$ graph of ZCGS/ZnS QDs synthesized with different Zn precursor amounts, and (b) a graph showing band gap changes of ZCGS vs. ZCGS/ZnS QDs.

Absorption spectra of ZCGS/ZnS core/shell QDs blue-shifted with increasing Zn amount added in core synthesis, as expected from the results of FIG. 17(a). The optical band gaps of ZCGS/ZnS QDs were identically determined through absorption spectral conversion to $(Ah\nu)^2$-$h\nu$ expression, and the results are shown in FIG. 21(a). Through comparison with FIG. 18, it can be seen that the band gap slight increases by 0.1 eV or less as compared to the respective core counterparts. Such a band gap increase would derive from additional alloying of preformed ZCGS core with ZnS in the course of shelling.

Referring to FIG. 21(b), as Zn amount in core synthesis increased, a margin of increase in band gap after shelling was smaller, hinting that the primitive ZnS shell formed adjunctively during core synthesis aforementioned would somewhat prevent a shell precursor of Zn species from diffusing into core host towards alloying.

Figure 22:
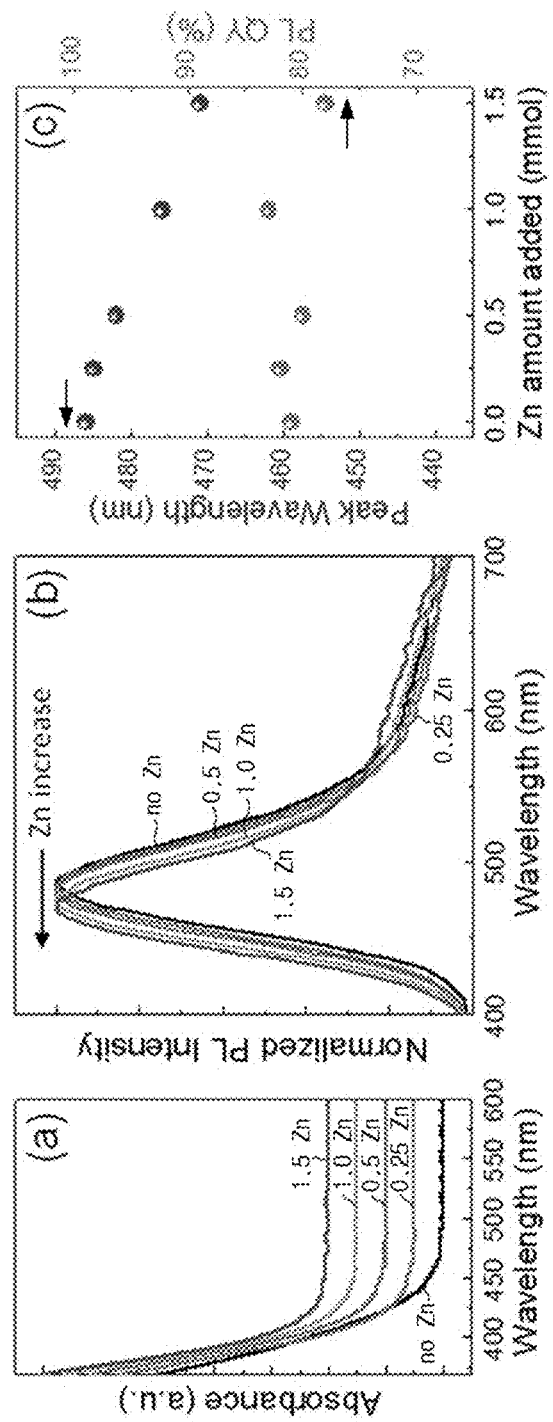
FIG. 22 shows (a) absorption, (b) normalized PL spectra, and (c) peak wavelength-PL QY of azure-to-blue-emitting ZCGS/ZnS QDs synthesized with different amounts of Zn precursor.

FIG. 22 shows (a) absorption, (b) normalized PL spectra, and (c) peak wavelength-PL QY of azure-to-blue-emitting ZCGS/ZnS QDs synthesized with different amounts of Zn precursor.

Referring to FIG. 22(b), as shown in normalized PLs of all ZCGS/ZnS QDs in FIG. 15(b), their spectral shapes were almost the same as those of CGS/ZnS ones, commonly comprising major emissions of CB-to-acceptor along with minor ones of DAP recombination. Referring to FIG. 22(c), peak wavelengths of their PLs steadily blueshifted from 486 to 471 nm, corresponding to the azure-to-blue color range, with increasing Zn amount added in core synthesis. PL QYs after elaborate ZnS shelling became dramatically improved to 78-83% and these values were also reproducibly attainable within a standard deviation of +3%.

Highly bright ZCGS/ZnS QD dispersions under UV irradiation were found. It is here worthy of emphasizing that our highly efficient blue ZCGS/ZnS QDs with emission wavelengths close to 470 nm are unique, taking into account that other non-Cd blue QD emitters of InP and ZnSe having such high QYs in the similar emission range have not been achieved yet.

As described hereinabove, ternary CGS/ZnS QDs with tunable PLs in the cyan-to-azure color range were first synthesized by means of control of off-stoichiometric Cu/Ga ratio towards Cu deficiency. Subsequently, to further push the emission to the blue side Zn alloying into Cu/Ga=1/8-based CGS QD host was implemented simply by adding different amounts of Zn species in core synthesis. It was revealed that a part of Zn species added indeed participated in alloying of CGS host, producing quaternary ZCGS QDs evidenced by optical, crystal structural, and compositional analyses. Upon appropriate shelling, the resulting ZCGS/ZnS QDs not only exhibited systematically emission-tunable wavelengths from 486 nm (azure) to 471 nm (blue) with a higher degree of core QD alloying but possessed sufficiently high QYs of 78-83% to be practically applicable to the following fabrication of optoelectronic devices.

Figure 23:
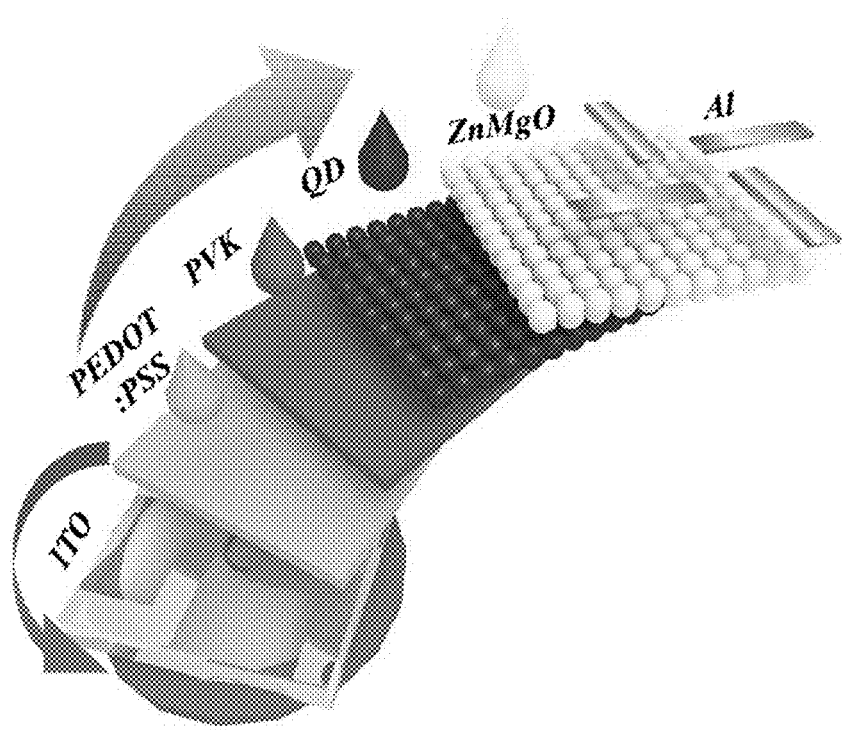
FIG. 23 is a diagram illustrating a blue QLED according to embodiments of the present disclosure and a fabricating method thereof.

Electrically-driven blue quantum dot light-emitting diode (QLED) was fabricated with ZCGS/ZnS core/shell QDs based emitting layer (EML). FIG. 23 is a diagram illustrating a blue QLED according to embodiments of the present disclosure and a fabricating method thereof. The lamination order is, as shown in FIG. 23, ITO/PEDOT:PSS HIL/PVK HTL/ZCGS/ZnS QDs EML/ZnMgO ETL/Al. [HIL: hole injection layer, HTL: hole transport layer, ETL: electron transport layer]

A glass substrate with ITO positive electrode was washed with each of acetone and methanol, and treated with UV-ozone for 20 min. Spin-coating with poly(ethylenedioxy-thiophene):polystyrene sulfonate (PEDOT:PSS)(AI 4083) at 3000 rpm for 60 sec and baking in 150° C. $N_2$ atmosphere for 30 min were performed to form HIL. A solution of 0.05 g poly(9-vinylcarbazole) (PVK) (average MW=25000-50000) in 5 ml chlorobenzene was spin-coated on HIL at 3000 rpm for 60 sec and baked under the same condition as HIL to form HTL. A dispersion of ZCGS/ZnS in hexane adjusted to the optical density of 0.8 at 370 nm was spin-coated on HTL at 3000 rpm for 20 sec and dried at room temperature. After QD EML was formed, a dispersion of ZnMgO nanoparticles in ethanol was spin-coated at 3000 rpm for 60 sec and dried at room temperature. Finally, 100 nm thick Al negative electrode was formed by a thermal evaporation method through a linear metal mask, completing the fabrication of devices.

Figure 24:
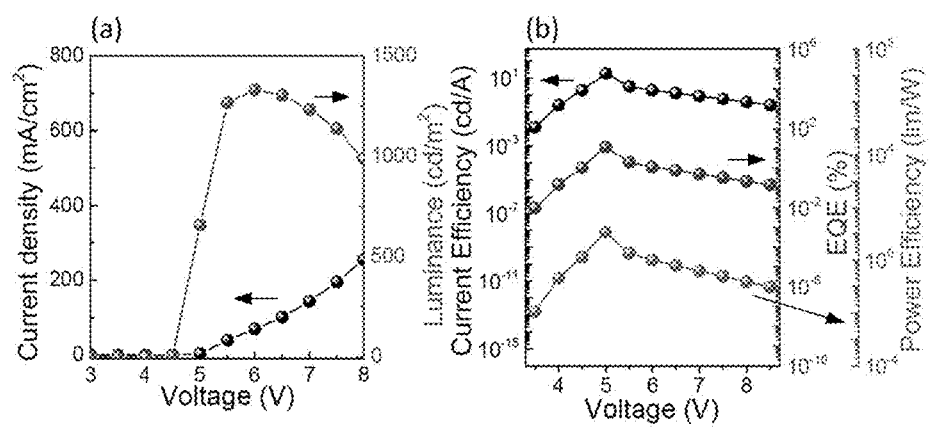
FIG. 24 shows (a) a graph of current density-luminance changes vs voltage for a blue QLED fabricated according to embodiments of the present disclosure, and (b) a graph of current efficiency-EQE (external quantum efficiency)-power efficiency changes.

FIG. 24(a) is a graph of current density-luminance changes vs voltage for a blue QLED fabricated according to embodiments of the present disclosure, and FIG. 24(b) is a graph of current efficiency-EQE (external quantum efficiency)-power efficiency changes. Referring to FIG. 24(a), the blue QLED according to embodiments of the present disclosure has the maximum luminance of 1330 cd/m$^2$ at the operating voltage of 6V. As shown in FIG. 24(b), the maximum current efficiency, the maximum EQE, and the maximum power efficiency at 5V, 1266 cd/m$^2$ are 18.6 cd/A, 11.5%, 11.7 lm/W, respectively. These numerical values have not been reported in earlier cadmium-free I-III-VI type blue QLEDs, and show outstanding properties.

Figure 25:
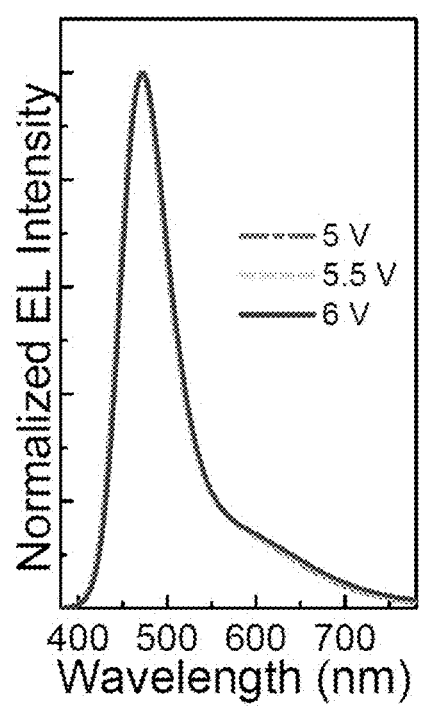
FIG. 25 shows normalized EL spectra vs applied voltage for a blue QLED fabricated according to embodiments of the present disclosure.

FIG. 25 shows normalized EL spectra vs applied voltage for a blue QLED fabricated according to embodiments of the present disclosure.

This work was financially supported by the National Research Foundation of Korea (NRF) grant funded by Ministry of Science, ICT & Future Planning (MSIP) (No. 2017R1A2B3008628), Basic Science Research Program through the NRF funded by Ministry of Education (No. 2015R1A6A1A03031833), and the Korea Institute of Energy Technology Evaluation and Planning (KETEP) and the Ministry of Trade, Industry & Energy (MOTIE) (No. 20163030013980).

While the embodiments of the present disclosure have been hereinabove illustrated and described, the present disclosure is not limited to the particular embodiments described above, and it is obvious to those skilled in the art that various modifications can be made thereto without departing from the essence of the present disclosure, and such modifications fall within the scope of the appended claims.

What is claimed is:

1. A method for fabricating quantum dots, comprising:
forming type ternary Cu—Ga—S core quantum dots; and
forming ZnS multishell on the core quantum dots,
wherein the Cu—Ga—S has Cu:Ga of 1:10 to 1:1,
wherein the forming of the ZnS multishell on the core quantum dots is performed by application of ZnS stock solution,
wherein the application of the ZnS stock solution is performed continuously twice or more at different concentrations of each ZnS stock solution and different reaction temperatures.

2. The method for fabricating quantum dots according to claim 1, wherein the forming of the Cu—Ga—S core quantum dots is performed by heating a blend solution containing precursors of Cu, Ga and S, sulfur, and solvent.

3. A method for fabricating quantum dots, the method comprising:
forming I-III-VI type ternary Cu—Ga—S core quantum dots; and
forming ZnS multishell on the core quantum dots,
wherein the Cu—Ga—S has Cu:Ga of 1:10 to 1:1,
wherein the forming of the Cu—Ga—S core quantum dots is performed by heating a blend solution containing CuI, GaI, 1-dodecanethiol, sulfur, and oleylamine, and
wherein the forming of the ZnS multishell on the core quantum dots comprises:
applying ZnS stock solution containing zinc acetate, octadecene, and oleic acid; and
applying another ZnS stock solution containing zinc stearate, octadecene, and 1-dodecanethiol.

4. A method for fabricating quantum dots, the method comprising:
forming I-III-VI type ternary Cu—Ga—S core quantum dots; and
forming ZnS multishell on the core quantum dots,
wherein the Cu—Ga—S has Cu:Ga of 1:10 to 1:1,
wherein the method further comprises forming I-III-VI type quaternary Zn—Cu—Ga—S core quantum dots by alloying Zn into the Cu—Ga—S core quantum dots, or forming Cu—Ga—Al—S core quantum dots by alloying Al into the Cu—Ga—S core quantum dots.

5. The method for fabricating quantum dots according to claim 4, wherein the Zn—Cu—Ga—S core quantum dots have Cu:(Zn+Ga) of 1:10 to 1:1, and the Cu—Ga—Al—S has Cu:(Ga+Al) of 1:10 to 1:1.

6. The method for fabricating quantum dots according to claim 4, wherein the forming of the Cu—Ga—S core quantum dots is performed by heating a blend solution containing precursors of Cu, Ga and S, sulfur, and solvent,
the forming of the Zn—Cu—Ga—S core quantum dots is performed with an addition of Zn precursor to the blend solution having the Cu—Ga—S core quantum dots, and
the forming of the Cu—Ga—Al—S core quantum dots is performed with an addition of Al precursor to the blend solution having the Cu—Ga—S core quantum dots.

7. The method for fabricating quantum dots according to claim 4, wherein the forming of the Cu—Ga—S core quantum dots is performed by heating a blend solution containing CuI, GaI, 1-dodecanethiol, sulfur, and oleylamine,
the forming of the Zn—Cu—Ga—S core quantum dots is performed with an addition of $ZnCl_2$ to the blend solution having the Cu—Ga—S core quantum dots, and
the forming of the ZnS multishell comprises:
applying ZnS stock solution containing zinc acetate, octadecene, and oleic acid; and
applying another ZnS stock solution containing zinc stearate, octadecene, and 1-dodecanethiol.

* * * * *